(12) United States Patent
Tomita

(10) Patent No.: US 12,074,619 B2
(45) Date of Patent: Aug. 27, 2024

(54) RADIO FREQUENCY MODULE AND COMMUNICATION DEVICE

(71) Applicant: Murata Manufacturing Co., Ltd., Nagaokakyo (JP)

(72) Inventor: Naohide Tomita, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 349 days.

(21) Appl. No.: 17/539,215

(22) Filed: Dec. 1, 2021

(65) Prior Publication Data

US 2022/0094376 A1 Mar. 24, 2022

Related U.S. Application Data

(63) Continuation of application No. PCT/JP2020/022654, filed on Jun. 9, 2020.

(30) Foreign Application Priority Data

Jul. 3, 2019 (JP) .................................. 2019-124838

(51) Int. Cl.
*H04B 1/00* (2006.01)
*H04B 1/04* (2006.01)
*H04B 1/16* (2006.01)

(52) U.S. Cl.
CPC ........... *H04B 1/0067* (2013.01); *H04B 1/006* (2013.01); *H04B 1/04* (2013.01); *H04B 1/1607* (2013.01); *H04B 2001/0408* (2013.01)

(58) Field of Classification Search
CPC ...... H04B 1/005; H04B 1/0053; H04B 1/006; H04B 1/0067; H04B 1/04;
(Continued)

(56) References Cited

U.S. PATENT DOCUMENTS

| | | | |
|---|---|---|---|
| 7,139,538 B2 * | 11/2006 | Ono | H04B 1/0483 455/115.1 |
| 8,175,541 B2 * | 5/2012 | Gorbachov | H04B 1/18 455/73 |
| 8,599,102 B2 * | 12/2013 | Arimura | G06K 19/07743 343/906 |

FOREIGN PATENT DOCUMENTS

| | | |
|---|---|---|
| JP | 11-274970 A | 10/1999 |
| JP | 11274970 A * | 10/1999 ............... H04B 1/40 |

(Continued)

OTHER PUBLICATIONS

International Search Report and Written Opinion mailed on Sep. 8, 2020, received for PCT Application PCT/JP2020/022654, Filed on Jun. 9, 2020, 8 pages including English Translation.

*Primary Examiner* — Quochien B Vuong
(74) *Attorney, Agent, or Firm* — XSENSUS LLP

(57) ABSTRACT

Improved is the isolation in a case in which a circuit element provided in a signal path for a transmission signal and a circuit element provided in a signal path for a reception signal are mounted on the same main surface of a mounting substrate. A radio frequency module includes the mounting substrate, a first, a second, and a third circuit elements, and a plurality of external connection terminals. The second circuit element and the third circuit element are mounted on a second main surface of the mounting substrate and are provided in signal paths for transmission and reception signals. The plurality of external connection terminals is arranged on the second main surface of the mounting substrate. The plurality of external connection terminals includes a ground terminal positioned between the second circuit element and the third circuit element in a plan view from a thickness direction of the mounting substrate.

20 Claims, 10 Drawing Sheets

(58) Field of Classification Search
CPC .......... H04B 2001/0408; H04B 1/1607; H04B 1/18; H04B 1/40; H04B 1/44; H04B 1/50; H04B 1/54
See application file for complete search history.

(56) References Cited

FOREIGN PATENT DOCUMENTS

| | | | | |
|---|---|---|---|---|
| JP | 2005033350 A | * | 2/2005 | ............ H03F 3/195 |
| WO | 2006/035518 A1 | | 4/2006 | |
| WO | 2018/110393 A1 | | 6/2018 | |
| WO | 2018/123699 A1 | | 7/2018 | |

* cited by examiner

RADIO FREQUENCY MODULE AND COMMUNICATION DEVICE

CROSS-REFERENCE TO RELATED APPLICATIONS

The present application is a continuation of and claims priority to PCT/JP2020/022654, filed Jun. 9, 2020, which claims priority to JP 2019-124838, filed Jul. 3, 2019, the entire contents of each are incorporated herein by its reference.

BACKGROUND

1. Field of the Disclosure

The present disclosure generally relates to a radio frequency module and a communication device, and more particularly relates to a radio frequency module capable of supporting both transmission of a transmission signal and reception of a reception signal, and a communication device including the radio frequency module.

2. Description of the Related Art

As a radio frequency module, there has been known a front-end module including a substrate (mounting substrate), a filter unit provided on the substrate, a switch IC that includes an amplification unit and is provided on the substrate (International Publication No. 2018/110393, for example).

In an example of a front-end module disclosed in International Publication No. 2018/110393, the filter unit is provided on one main surface of the substrate, and the switch IC is provided on the other main surface of the substrate.

The front-end module includes a plurality of electrodes (external connection terminals) provided on the other main surface of the substrate.

International Publication No. 2018/110393 discloses a communication device including an RF signal processing circuit that processes a radio frequency signal transmitted and received by an antenna element, and a front-end module.

In the radio frequency module, a function of transmitting a transmission signal and a function of receiving a reception signal may be required. In this case, the distance between a circuit element that is mounted on the other main surface of the substrate and provided in a signal path for a transmission signal, and a circuit element that is mounted on the other main surface of the substrate and provided in a signal path for a reception signal may become short in the radio frequency module. This may pose a problem in isolation between these two circuit elements.

SUMMARY

In the radio frequency module and the communication device according to the above aspect of the present disclosure, it is possible to improve isolation between a second circuit element and a third circuit element, in a case in which the second circuit element provided in a signal path for a transmission signal and the third circuit element provided in a signal path for a reception signal are mounted on a second main surface of a mounting substrate.

A radio frequency module according to an aspect of the present disclosure includes a mounting substrate, a first circuit element, a second circuit element, a third circuit element, and a plurality of external connection terminals. The mounting substrate has a first main surface and a second main surface opposed to each other. The first circuit element is mounted on the first main surface of the mounting substrate. The second circuit element is mounted on the second main surface of the mounting substrate, and is provided in a signal path for a transmission signal. The third circuit element is mounted on the second main surface of the mounting substrate and is provided in a signal path for a reception signal. The plurality of external connection terminals is arranged on the second main surface of the mounting substrate. The plurality of external connection terminals includes a ground terminal positioned between the second circuit element and the third circuit element in plan view from a thickness direction of the mounting substrate.

A communication device according to an aspect of the present disclosure includes the radio frequency module and a signal processing circuit that processes the transmission signal and the reception signal.

Other features, elements, characteristics and advantages of the present disclosure will become more apparent from the following detailed description of preferred embodiments of the present disclosure with reference to the attached drawings.

DETAILED DESCRIPTION

Figure 1:
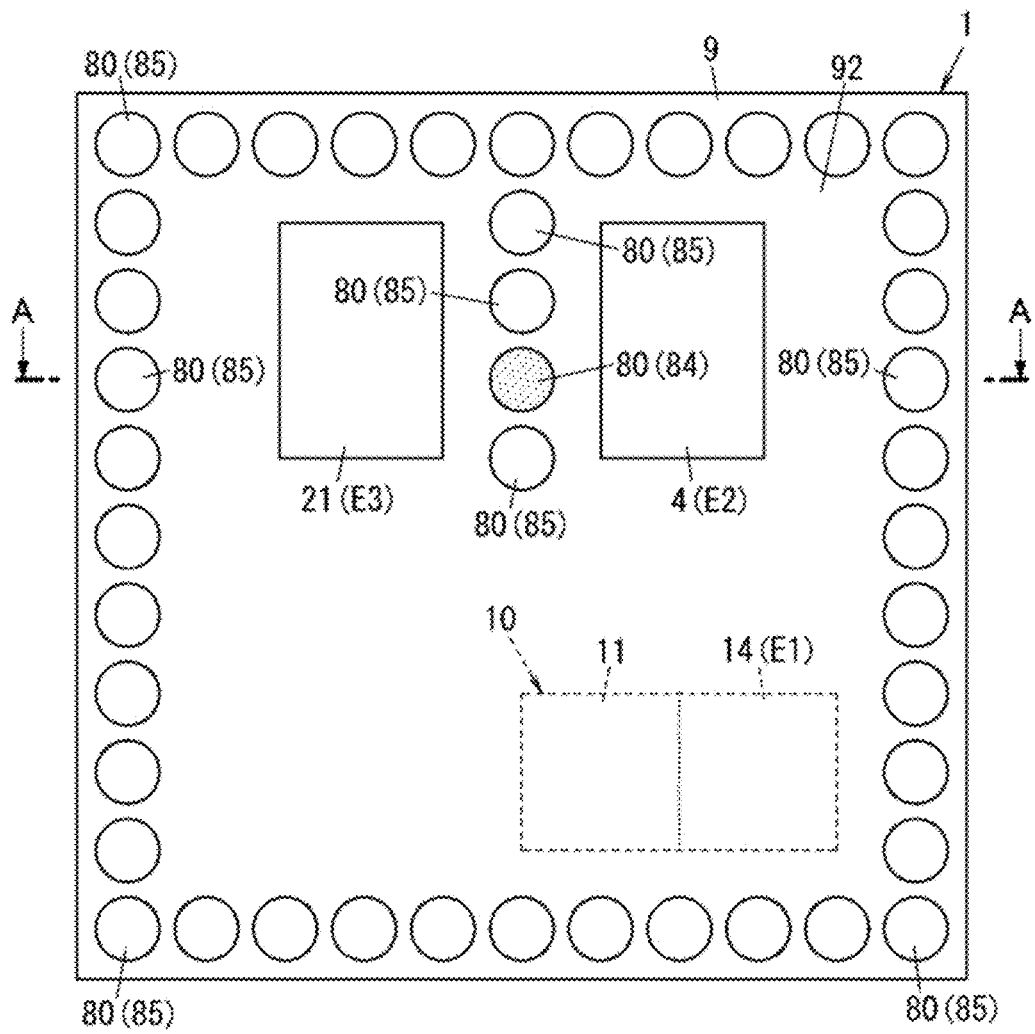
FIG. 1 is a bottom view of a radio frequency module according to an embodiment.

Each of FIG. 1 to FIG. 3 and FIG. 5 to FIG. 11 referred to in the following embodiments and the like is a schematic diagram, and the ratio of sizes or thicknesses of respective constituents in the diagram does not necessarily reflect the actual dimensional ratio.

Embodiment

Hereinafter, a radio frequency module 1 and a communication device 300 according to an embodiment will be described with reference to FIG. 1 to FIG. 4.

1. Radio Frequency Module and Communication Device

1.1. Circuit Configuration of Radio Frequency Module and Communication Device The circuit configuration of the radio frequency module 1 and the communication device 300 according to the embodiment will be described with reference to FIG. 4.

The radio frequency module 1 according to the embodiment is used in the communication device 300, for example. The communication device 300 is a mobile phone (such as smartphone), for example, but is not limited thereto, and may be a wearable terminal (such as smartwatch) or the like, for example. The radio frequency module 1 is capable of supporting a first communication standard and a second communication standard different from the first communication standard, for example. The first communication standard is the 2G (second generation mobile communication) standard, for example. The second communication standard is the 4G (fourth generation mobile communication) standard or the 5G (fifth generation mobile communication) standard, for example. The 2G standard is the GSM (registered trademark, GSM: Global System for Mobile Communications) standard, for example. The 4G standard is the 3GPP long term evolution (LTE) standard, for example. The 5G standard is the 5G new radio (NR) standard, for example. The radio frequency module 1 is capable of supporting the carrier aggregation and the dual connectivity.

For example, the radio frequency module 1 is configured to amplify a transmission signal inputted from a signal processing circuit 301 and output the amplified signal to an antenna 310. Further, the radio frequency module 1 is configured to amplify a reception signal inputted from the antenna 310 and output the amplified signal to the signal processing circuit 301. The signal processing circuit 301 is not a constituent of the radio frequency module 1, but a constituent of the communication device 300 including the radio frequency module 1. The radio frequency module 1 according to the embodiment is controlled by the signal processing circuit 301 included in the communication device 300, for example. The communication device 300 includes the radio frequency module 1 and the signal processing circuit 301. The communication device 300 further includes the antenna 310.

The signal processing circuit 301 includes an RF signal processing circuit 302 and a baseband signal processing circuit 303, for example. The RF signal processing circuit 302 is a radio frequency integrated circuit (RFIC), for example, and performs signal processing on a radio frequency signal. The RF signal processing circuit 302 performs signal processing such as up-conversion on a signal (transmission signal) outputted from the baseband signal processing circuit 303, and outputs the radio frequency signal subjected to the signal processing, for example. The RF signal processing circuit 302 performs signal processing such as down-conversion on a radio frequency signal (reception signal) outputted from the radio frequency module 1, and outputs the signal subjected to the signal processing to the baseband signal processing circuit 303, for example. The baseband signal processing circuit 303 is a baseband integrated circuit (BBIC), for example, and performs predetermined signal processing on a transmission signal from the outside of the signal processing circuit 301. The reception signal processed by the baseband signal processing circuit 303 is used as an image signal for image display or as an audio signal for communication, for example. The radio frequency module 1 transfer a radio frequency signal (reception signal and transmission signal) between the antenna 310 and the RF signal processing circuit 302 of the signal processing circuit 301. The baseband signal processing circuit 303 is not an essential constituent for the communication device 300.

The radio frequency module 1 according to the embodiment includes a power amplifier 11 (hereinafter also referred to as a first power amplifier 11), a low-noise amplifier 21, and a power amplifier 14 (hereinafter also referred to as a second power amplifier 14). The radio frequency module 1 includes two transmission filters 12A and 12B, two reception filters 22A and 22B, and a transmission/reception filter 32C. The radio frequency module 1 includes an output matching circuit 13 (hereinafter also referred to as a first output matching circuit 13), an input matching circuit 23, and an output matching circuit 16 (hereinafter also referred to as a second output matching circuit 16). The radio frequency module 1 includes a first switch 4, a second switch 5, a third switch 6, and a fourth switch 7. In the radio frequency module 1, the second power amplifier 14 supports the first frequency band, the first power amplifier 11 supports the second frequency band, and the low-noise amplifier 21 supports the second frequency band.

The radio frequency module 1 includes a plurality of external connection terminals 80. The plurality of external connection terminals 80 includes an antenna terminal 81, a signal input terminal 82 (hereinafter also referred to as a first signal input terminal 82), a signal output terminal 83, and a signal input terminal 84 (hereinafter also referred to as a second signal input terminal 84).

The first power amplifier 11 has an input terminal 111 and an output terminal 112. The first power amplifier 11 amplifies a transmission signal in the second frequency band inputted to the input terminal 111 and outputs the amplified signal from the output terminal 112. Here, the second frequency band includes a first communication band, a second communication band, and a third communication band, for example. The first communication band corresponds to a transmission signal passing through the transmission filter 12A, and is Band11 of the 3GPP LTE standard, for example. The second communication band corresponds to a transmission signal passing through the transmission filter 12B, and is Band22 of the 3GPP LTE standard, for example. The third communication band corresponds to a transmission signal passing through the transmission/reception filter 32C, and is Band42 and Band48 of the 3GPP LTE standard, or n77 of the 5G NR standard, for example. The input terminal 111 of the first power amplifier 11 is connected to the first signal input terminal 82. The input terminal 111 of the first power amplifier 11 is connected to the signal processing circuit 301 via the first signal input terminal 82. The first signal input terminal 82 is a terminal for inputting a radio frequency signal (transmission signal) from an external circuit (signal processing circuit 301, for example) to the radio frequency module 1. The output terminal 112 of the first power amplifier 11 is connected to a common terminal 50 of the second switch 5 via the first output matching circuit 13.

The low-noise amplifier 21 has an input terminal 211 and an output terminal 212. The low-noise amplifier 21 amplifies a reception signal in the second frequency band inputted to the input terminal 211 and outputs the amplified signal from the output terminal 212. The input terminal 211 of the low-noise amplifier 21 is connected to a common terminal 60 of the third switch 6 via the input matching circuit 23. The output terminal 212 of the low-noise amplifier 21 is connected to the signal output terminal 83. The output terminal 212 of the low-noise amplifier 21 is connected to the signal processing circuit 301 via the signal output terminal 83, for example. The signal output terminal 83 is a terminal for outputting a radio frequency signal (reception signal) from the low-noise amplifier 21 to an external circuit (signal processing circuit 301, for example).

The second power amplifier 14 has an input terminal 141 and an output terminal 142. The second power amplifier 14 amplifies a transmission signal of the first frequency band inputted to the input terminal 141 and outputs the amplified signal from the output terminal 142. The first frequency band includes GSM850, GSM900, DSC1800, and PCS1900 of the GSM (registered trademark) standard, for example. The input terminal 141 of the second power amplifier 14 is connected to the second signal input terminal 84. The output terminal 142 of the second power amplifier 14 is connected to the first switch 4 via the second output matching circuit 16.

The transmission filter 12A is a filter whose pass band is the transmission band of the first communication band, for example. The transmission filter 12B is a filter whose pass band is the transmission band of the second communication band, for example. The reception filter 22A is a filter whose pass band is the reception band of the first communication band, for example. The reception filter 22B is a filter whose pass band is the reception band of the second communication band, for example. The transmission filter 12A and the reception filter 22A may constitute a duplexer for the first communication band. The transmission filter 12B and the reception filter 22B may constitute a duplexer for the second communication band. The transmission/reception filter 32C is a filter whose pass band is the transmission/reception band of the third communication band, for example.

The first switch 4 includes a common terminal 40 and four selection terminals 41 to 44. The common terminal 40 is connected to the antenna terminal 81. The antenna 310 is connected to the antenna terminal 81. The selection terminal 41 is connected to the connection point between the output terminal of the transmission filter 12A and the input terminal of the reception filter 22A. The selection terminal 42 is connected to the connection point between the output terminal of the transmission filter 12B and the input terminal of the reception filter 22B. The selection terminal 43 is connected to the transmission/reception filter 32C. The selection terminal 44 is connected to the second output matching circuit 16. The first switch 4 is capable of coupling at least one of the four selection terminals 41 to 44 to the common terminal 40, for example. Here, the first switch 4 is capable of one-to-one coupling or one-to-many coupling, for example.

The first switch 4 is controlled by the signal processing circuit 301, for example. The first switch 4 switches the coupling state between the common terminal 40 and the four selection terminals 41 to 44 in accordance with a control signal from the RF signal processing circuit 302 of the signal processing circuit 301. The first switch 4 is a switch integrated circuit (IC), for example.

The second switch 5 includes the common terminal 50 and three selection terminals 51 to 53. The common terminal 50 is connected to the output terminal 112 of the power amplifier 11 via the output matching circuit 13. The selection terminal 51 is connected to the input terminal of the transmission filter 12A. The selection terminal 52 is connected to the input terminal of the transmission filter 12B. The selection terminal 53 is connected to a selection terminal 71 of the fourth switch 7. The second switch 5 is capable of coupling at least one of the three selection terminals 51 to 53 to the common terminal 50, for example. Here, the second switch 5 is capable of one-to-one coupling or one-to-many coupling, for example.

The second switch 5 is controlled by the signal processing circuit 301, for example. The second switch 5 switches the coupling state between the common terminal 50 and the three selection terminals 51 to 53 in accordance with a control signal from the RF signal processing circuit 302 of the signal processing circuit 301. The second switch 5 is a switch IC, for example.

The third switch 6 includes the common terminal 60 and three selection terminals 61 to 63. The common terminal 60 is connected to the input terminal 211 of the low-noise amplifier 21 via the input matching circuit 23. The selection terminal 61 is connected to the output terminal of the reception filter 22A. The selection terminal 62 is connected to the output terminal of the reception filter 22B. The selection terminal 63 is connected to a selection terminal 72 of the fourth switch 7. The third switch 6 is capable of coupling at least one of the three selection terminals 61 to 63 to the common terminal 60, for example. Here, the third switch 6 is capable of one-to-one coupling and one-to-many coupling, for example.

The third switch 6 is controlled by the signal processing circuit 301, for example. The third switch 6 switches the coupling state between the common terminal 60 and the three selection terminals 61 to 63 in accordance with a control signal from the RF signal processing circuit 302 of the signal processing circuit 301. The third switch 6 is a switch IC, for example.

The fourth switch 7 includes a common terminal 70 and the above-described two selection terminals 71 and 72. The common terminal 70 is connected to one of two input/output terminals of the transmission/reception filter 32C. The selection terminal 71 is connected to the selection terminal 53 of the second switch 5. The selection terminal 72 is connected to the selection terminal 63 of the third switch 6. In the fourth switch 7, one of the selection terminals 71 and 72 is exclusively coupled to the common terminal 70. The fourth switch 7 may be configured by a single pole double throw (SPDT) type switch, for example. The fourth switch is a switch IC, for example.

The first output matching circuit 13 is provided in the signal path between the output terminal 112 of the first power amplifier 11 and the common terminal 50 of the second switch 5. The first output matching circuit 13 a circuit for matching the impedance between the first power amplifier 11 and the transmission filters 12A and 12B, and between the first power amplifier 11 and the transmission/reception filter 32C. The first output matching circuit 13 is constituted of one inductor, for example, but is not limited thereto, and may include a plurality of inductors and a plurality of capacitors, for example.

The input matching circuit 23 is provided in the signal path between the input terminal 211 of the low-noise amplifier 21 and the common terminal 60 of the third switch 6. The input matching circuit 23 is a circuit for matching the impedance between the low-noise amplifier 21 and the reception filters 22A and 22B, and between the low-noise amplifier 21 and the transmission/reception filter 32C. The input matching circuit 23 is constituted of one inductor, for example, but is not limited thereto, and may include a plurality of inductors and a plurality of capacitors, for example.

The second output matching circuit 16 is provided in the signal path between the output terminal 142 of the second power amplifier 14 and the selection terminal 44 of the first switch 4. The second output matching circuit 16 is a circuit for matching the impedance between the second power amplifier 14 and the antenna 310. The second output matching circuit 16 is constituted of one inductor, for example, but is not limited thereto, and may include a plurality of inductors and a plurality of capacitors, for example.

The fourth switch 7 of the radio frequency module 1 may achieve virtual simultaneous transmission/reception of a transmission signal (radio frequency signal for transmission) in a predetermined frequency band and a reception signal (radio frequency signal for reception) in a predetermined frequency band using time division duplex (TDD), for example. Here, the virtual simultaneous transmission/reception means that the transmission of a transmission signal and the reception of a reception signal are not performed at the same time, but are alternately performed in such a short period of time that may be regarded as simultaneous.

1.2. Structure of Radio Frequency Module

Figure 2:
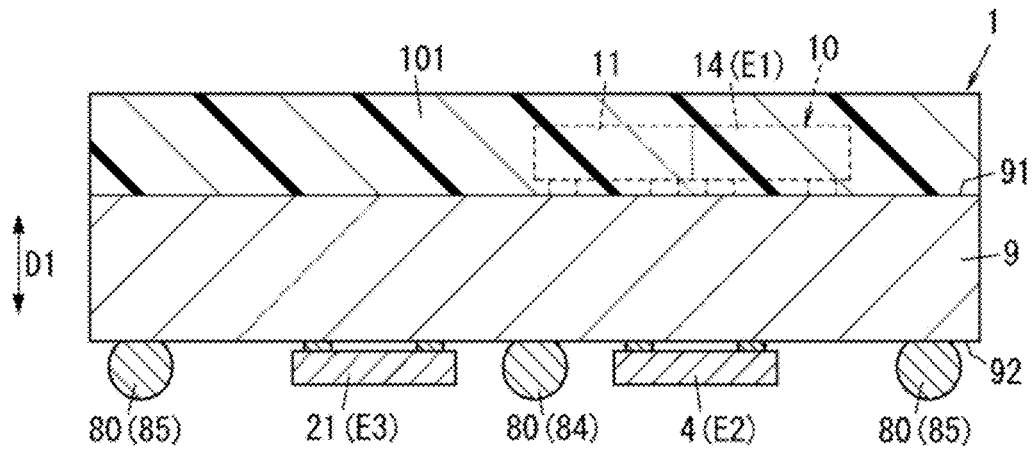
FIG. 2 is a sectional view taken along a line A-A of FIG. 1, and illustrates the radio frequency module.

Hereinafter, the radio frequency module 1 will be described with reference to FIG. 1 and FIG. 2.

The radio frequency module 1 includes a mounting substrate 9, a plurality of circuit elements, and the plurality of external connection terminals 80.

The mounting substrate 9 has a first main surface 91 and a second main surface 92 opposed to each other. Otherwise stated, the first main surface 91 and the second main surface 92 are on opposite sides of the mounting substrate 9. The mounting substrate 9 is such as a printed wiring board, a low temperature co-fired ceramics (LTCC) substrate, for example. Here, the mounting substrate 9 is a multilayer substrate including a plurality of dielectric layers and a plurality of conductor pattern layers, for example. The plurality of dielectric layers and the plurality of conductor pattern layers are laminated in a thickness direction D1 of the mounting substrate 9. Each of the plurality of conductor pattern layers is formed in a predetermined pattern. Each of the plurality of conductor pattern layers includes one or a plurality of conductor portions in one plane orthogonal to the thickness direction D1 of the mounting substrate 9. The material of each conductor pattern layer is copper, for example.

The first main surface 91 and the second main surface 92 of the mounting substrate 9 are separated from each other in the thickness direction D1 of the mounting substrate 9, and intersect with the thickness direction D1 of the mounting substrate 9. The first main surface 91 of the mounting substrate 9 is orthogonal to the thickness direction D1 of the mounting substrate 9, for example. However, the first main surface 91 may include such as a side surface of the conductor portion as a surface that is not orthogonal to the thickness direction D1, for example. The second main surface 92 of the mounting substrate 9 is orthogonal to the thickness direction D1 of the mounting substrate 9, for example. However, the second main surface 92 may include such as a side surface of the conductor portion as a surface that is not orthogonal to the thickness direction D1, for example. Further, the first main surface 91 and the second main surface 92 of the mounting substrate 9 may have fine irregularities, concave portions, or convex portions.

As the plurality of circuit elements, the radio frequency module 1 includes the above-described first power amplifier 11, the second power amplifier 14, the low-noise amplifier 21, the two transmission filters 12A and 12B, the two reception filters 22A and 22B, the transmission/reception filter 32C, the first output matching circuit 13, the second output matching circuit 16, and the input matching circuit 23. The plurality of circuit elements of the radio frequency module 1 is mounted on the mounting substrate 9. The plurality of circuit elements is not limited to electronic components mounted on the mounting substrate 9, and may include circuit elements provided in the mounting substrate 9. In FIG. 1 and FIG. 2, of the plurality of circuit elements, circuit elements other than the first power amplifier 11, the second power amplifier 14, the low-noise amplifier 21, and the first switch 4 are not illustrated. In the radio frequency module 1 according to the embodiment, the second power amplifier 14 constitutes a first circuit element E1 mounted on the first main surface 91 of the mounting substrate 9. In the radio frequency module 1 according to the embodiment, the first switch 4 is mounted on the second main surface 92 of the mounting substrate 9 and constitutes a second circuit element E2 provided in the signal path for a transmission signal. Here, the first switch 4 is provided in both the signal path for a transmission signal and the signal path for a reception signal. In the radio frequency module 1, the first switch 4 is provided in the signal path for a transmission signal in which the first power amplifier 11, the first output matching circuit 13, the second switch 5, and the transmission filter 12A are provided. The first switch 4 is provided in the signal path for a transmission signal in which the first power amplifier 11, the first output matching circuit 13, the second switch 5, and the transmission filter 12B are provided. The first switch 4 is provided in the signal path for a transmission signal in which the first power amplifier 11, the first output matching circuit 13, the fourth switch 7, and the transmission/reception filter 32C are provided. The first switch 4 is provided in the signal path for a transmission signal in which the second power amplifier 14 and the output matching circuit 16 are provided. The first switch 4 is provided in the signal path for a reception signal in which the reception filter 22A, the third switch 6, the input matching circuit 23, and the low-noise amplifier 21 are provided. The first switch 4 is provided in the signal path for a reception signal in which the reception filter 22B, the third switch 6, the input matching circuit 23, and the low-noise amplifier 21 are provided. The first switch 4 is provided in the signal path for a reception signal in which the transmission/reception filter 32C, the fourth switch 7, the input matching circuit 23, and the low-noise amplifier 21 are provided. In the radio frequency module 1 according to the embodiment, the low-noise amplifier 21 is mounted on the second main surface 92 of the mounting substrate 9, and constitutes a third circuit element E3 provided in the signal path for a reception signal.

In the radio frequency module 1, the first power amplifier 11 and the second power amplifier 14 are integrated in one semiconductor chip 10. In other words, the semiconductor chip 10 includes the first power amplifier 11 and the second power amplifier 14. The semiconductor chip 10 is a one-chip IC chip including a substrate having a first main surface (front surface) and a second main surface (back surface) opposed to each other, a first amplification function unit, which includes at least one first transistor, formed on the side of the first main surface of the substrate, and a second amplification function unit, which includes at least one second transistor, formed on the side of the first main surface of the substrate. The substrate is a gallium arsenide substrate, for example. The first amplification function unit has a function of amplifying a transmission signal inputted to the input terminal 111 of the first power amplifier 11. The second amplification function unit has a function of amplifying a transmission signal inputted to the input terminal 141 of the second power amplifier 14. Each of the first transistor and the second transistor is a heterojunction bipolar transistor (HBT), for example. Each of the first power amplifier 11 and the second power amplifier 14 may include a DC cut capacitor in addition to the amplification function unit, for example. The semiconductor chip 10 is flip-chip mounted on the first main surface 91 of the mounting substrate 9 such that, of the first main surface and the second main surface of the substrate, the first main surface faces the first main surface 91 of the mounting substrate 9. The outer peripheral shape of the semiconductor chip 10 is a substantially quadrilateral shape in a plan view from the thickness direction D1 of the mounting substrate 9.

The low-noise amplifier 21 is a one-chip IC chip including a substrate having a first main surface (front surface) and a second main surface (back surface) opposed to each other, and an amplification function unit formed on the side of the first main surface of the substrate, for example. The substrate is a silicon substrate, for example. The amplification function unit has a function of amplifying the reception signal inputted to the input terminal 211 of the low-noise amplifier 21. The function unit includes a transistor. The low-noise amplifier 21 is flip-chip mounted on the second main surface 92 of the mounting substrate 9 such that, of the first main surface and the second main surface of the substrate, the first main surface faces the second main surface 92 of the mounting substrate 9. The outer peripheral shape of the low-noise amplifier 21 is a substantially quadrilateral shape in a plan view from the thickness direction D1 of the mounting substrate 9.

The two transmission filters 12A and 12B, the two reception filters 22A and 22B, and the transmission/reception filter 32C are one-chip filters, for example. The two transmission filters 12A and 12B, the two reception filters 22A and 22B, and the transmission/reception filter 32C have a substantially quadrilateral shape as the outer peripheral shape in a plan view from the thickness direction D1 of the mounting substrate 9. The filter is a ladder filter, for example, and includes a plurality of (four, for example) series arm resonators and a plurality of (three, for example) parallel arm resonators. The filter is an acoustic wave filter, for example, and each of the plurality of series arm resonators and the plurality of parallel arm resonators is formed of an acoustic wave resonator. The acoustic wave filter is a surface acoustic wave (SAW) filter using a surface acoustic wave, for example. In this case, for example, the filter includes: a substrate having a first main surface (front surface) and a second main surface (back surface), a low acoustic velocity film provided on the first main surface of the substrate, a piezoelectric layer provided on the low acoustic velocity film, a plurality of first interdigital transducer (IDT) electrodes, and a plurality of second IDT electrodes. The plurality of first IDT electrodes on the piezoelectric layer corresponds to the plurality of series arm resonators on a one-to-one basis, and the plurality of second IDT electrodes on the piezoelectric layer corresponds to the plurality of parallel arm resonators on a one-to-one basis. Here, the low acoustic velocity film is directly or indirectly provided on the substrate. The piezoelectric layer is directly or indirectly provided on the low acoustic velocity film. The acoustic velocity of a bulk wave propagating through the low acoustic velocity film is lower than the acoustic velocity of a bulk wave propagating through the piezoelectric layer. The acoustic velocity of a bulk wave propagating through the substrate is higher than the acoustic velocity of an acoustic wave propagating through the piezoelectric layer. The material of the piezoelectric layer is lithium tantalate, for example. The material of the low acoustic velocity film is silicon oxide, for example. The substrate is a silicon substrate, for example. When the wavelength of an acoustic wave determined by the electrode finger period of the IDT electrode is defined as $\lambda$, the thickness of the piezoelectric layer is $3.5\lambda$ or less, for example. The thickness of the low acoustic velocity film is $2.0\lambda$ or less, for example.

The piezoelectric layer may be formed of any of lithium tantalate, lithium niobate, zinc oxide, aluminum nitride, and PZT, for example. The low acoustic velocity film may contain at least one material selected from the group consisting of silicon oxide, glass, silicon oxynitride, tantalum oxide, and a compound obtained by adding fluorine, carbon, or boron to silicon oxide. The substrate may contain at least one material selected from the group consisting of silicon, aluminum nitride, aluminum oxide, silicon carbide, silicon nitride, sapphire, lithium tantalate, lithium niobate, quartz, alumina, zirconia, cordierite, mullite, steatite, forsterite, magnesia, and diamond.

The filter may further include a spacer layer and a cover member, for example. The spacer layer and the cover member are provided on the side of the first main surface of the substrate. The spacer layer surrounds the plurality of IDT electrodes in a plan view from the thickness direction of the substrate. The spacer layer has a substantially frame shape (substantially rectangular frame shape) in a plan view from the thickness direction of the substrate. The spacer layer has an electrical insulation property. The material of the spacer layer is a synthetic resin such as an epoxy resin or a polyimide resin, for example. The cover member has a substantially flat plate shape. The cover member has a substantially rectangular shape in a plan view from the thickness direction of the substrate, but not limited to this, and may have a substantially square shape, for example. In the filter, the outer size of the spacer layer and the outer size of the cover member are substantially the same in a plan view from the thickness direction of the substrate. The cover member is disposed on the spacer layer in order to face the substrate in the thickness direction of the substrate. The cover member overlaps with the plurality of IDT electrodes in the thickness direction of the substrate, and is separated from the plurality of IDT electrodes in the thickness direction of the substrate. The cover member has an electrical insulation property. The material of the cover member is a synthetic resin such as an epoxy resin or a polyimide resin, for example. The filter has a space surrounded by the substrate, the spacer layer, and the cover member. The filter contains a gas in the space. The gas is air, an inert gas (such as nitrogen gas), or the like, for example. The plurality of terminals of the filter is exposed from the cover member. Each of the plurality of terminals is a bump, for example. Each bump is a solder bump, for example. Each bump is not limited to a solder bump and may be a gold bump, for example.

The filter is mounted on the first main surface 91 of the mounting substrate 9. The filter is arranged such that, of the first main surface and the second main surface of the substrate, the first main surface faces the mounting substrate 9. The outer peripheral shape of the filter is a substantially quadrilateral shape in a plan view from the thickness direction D1 of the mounting substrate 9. The filter is not necessarily mounted on the first main surface 91 of the mounting substrate 9, and may be mounted on the second main surface 92, for example.

The filter may include a close contact layer interposed between the low acoustic velocity film and the piezoelectric layer, for example. The close contact layer is made of resin (epoxy resin, polyimide resin), for example. The filter may include a dielectric film between the low acoustic velocity film and the piezoelectric layer, on the piezoelectric layer, or under the low acoustic velocity film.

The filter may include a high acoustic velocity film interposed between the substrate and the low acoustic velocity film, for example. Here, the high acoustic velocity film is directly or indirectly provided on the substrate. The low acoustic velocity film is directly or indirectly provided on the high acoustic velocity film. The piezoelectric layer is directly or indirectly provided on the low acoustic velocity film. The acoustic velocity of a bulk wave propagating through the high acoustic velocity film is higher than the acoustic velocity of an acoustic wave propagating through the piezoelectric layer. The acoustic velocity of a bulk wave propagating through the low acoustic velocity film is lower than the acoustic velocity of a bulk wave propagating through the piezoelectric layer.

The high acoustic velocity film is made of diamond-like carbon, aluminum nitride, aluminum oxide, silicon carbide, silicon nitride, silicon, sapphire, lithium tantalate, lithium niobate, a piezoelectric material such as quartz, various ceramics, magnesia, diamond, a material containing the above-described materials as a main component, or a material containing a mixture of the above-described materials as a main component. The various ceramics include such as alumina, zirconia, cordierite, mullite, steatite, and forsterite.

The thickness of the high acoustic velocity film is preferably as large as possible since the high acoustic velocity film has a function of confining the acoustic wave in the piezoelectric layer and the low acoustic velocity film. The piezoelectric substrate may include a close contact layer, a dielectric film, or the like in addition to the high acoustic velocity film, the low acoustic velocity film, and the piezoelectric layer.

Each of the plurality of series arm resonators and the plurality of parallel arm resonators is not limited to the acoustic wave resonator described above, and may be a surface acoustic wave (SAW) resonator or a bulk acoustic wave (BAW) resonator, for example. Here, the SAW resonator includes a piezoelectric substrate and an IDT electrode provided on the piezoelectric substrate, for example. In a case in which each of the plurality of series arm resonators and the plurality of parallel arm resonators is formed of a SAW resonator, the filter includes a plurality of IDT electrodes on one piezoelectric substrate. The plurality of IDT electrodes includes a plurality of IDT electrodes corresponding to the plurality of series arm resonators on a one-to-one basis and a plurality of IDT electrodes corresponding to the plurality of parallel arm resonators on a one-to-one basis. The piezoelectric substrate is a lithium tantalate substrate or a lithium niobate substrate, for example.

Each of the first switch 4, the second switch 5, the third switch 6, and the fourth switch 7 is a switch IC. More specifically, each of the first switch 4, the second switch 5, the third switch 6, and the fourth switch 7 is a one-chip IC chip including a substrate having a first main surface (front surface) and a second main surface (back surface) opposed to each other, and a switch function unit, which is formed on the side of the first main surface of the substrate, including a field effect transistor (FET), for example. The substrate is a silicon substrate, for example. The switch function unit has a function of switching a coupling state. Each of the first switch 4, the second switch 5, the third switch 6, and the fourth switch 7 is flip-chip mounted on the second main surface 92 of the mounting substrate 9 such that, of the first main surface and the second main surface of the substrate, the first main surface faces the second main surface 92 of the mounting substrate 9. The outer peripheral shape of each of the first switch 4, the second switch 5, the third switch 6, and the fourth switch 7 is a substantially quadrilateral shape in a plan view from the thickness direction D1 of the mounting substrate 9.

Each of the plurality of inductors in the first output matching circuit 13 is a chip inductor, for example. The plurality of inductors in the first output matching circuit 13 is mounted on the first main surface 91 of the mounting substrate 9, for example, but is not limited thereto. Each of the plurality of capacitors of the first output matching circuit 13 is a chip capacitor, for example. The plurality of capacitors in the first output matching circuit 13 is mounted on the first main surface 91 of the mounting substrate 9, for example, but is not limited thereto. The first output matching circuit 13 may be a one-chip integrated passive device (IPD) including a substrate having a first main surface (front surface) and a second main surface (back surface) opposed to each other, and a plurality of inductors and a plurality of capacitors formed on the side of the first main surface of the substrate, for example. The substrate is a silicon substrate, for example. In the case of the IPD, the first output matching circuit 13 is flip-chip mounted on the first main surface 91 of the mounting substrate 9 such that, of the first main surface and the second main surface of the substrate, the first main surface faces the first main surface 91 of the mounting substrate 9, for example.

The inductor in the input matching circuit 23 is a chip inductor, for example. The inductor in the input matching circuit 23 is mounted on the first main surface 91 of the mounting substrate 9, for example, but is not limited thereto.

The plurality of external connection terminals 80 is arranged on the second main surface 92 of the mounting substrate 9. Each of the plurality of external connection terminals 80 is a bump. Here, the bump is substantially spherical, for example. In this case, each of the plurality of external connection terminals 80 is a ball bump. The material of the ball bump is gold, copper, solder, or the like, for example.

The plurality of external connection terminals 80 includes a plurality of ground terminals 85 in addition to the antenna terminal 81, the first signal input terminal 82, the signal output terminal 83, and the second signal input terminal 84 described above. The plurality of ground terminals 85 is electrically connected to the ground electrode of the above-described circuit substrate included in the communication device 300 and is applied a ground potential. In FIG. 1, among the plurality of external connection terminals 80, only the second signal input terminal 84 and the plurality of ground terminals 85 are illustrated. The plurality of ground terminals 85 includes a first group of the ground terminals 85 and a second group of the ground terminals 85. The first group of the ground terminals 85 is arranged along the outer periphery of the second main surface 92 of the mounting substrate 9, and the second group of the ground terminals 85 is arranged inside the first group of the ground terminals 85 on the second main surface 92 of the mounting substrate 9.

Figure 3:
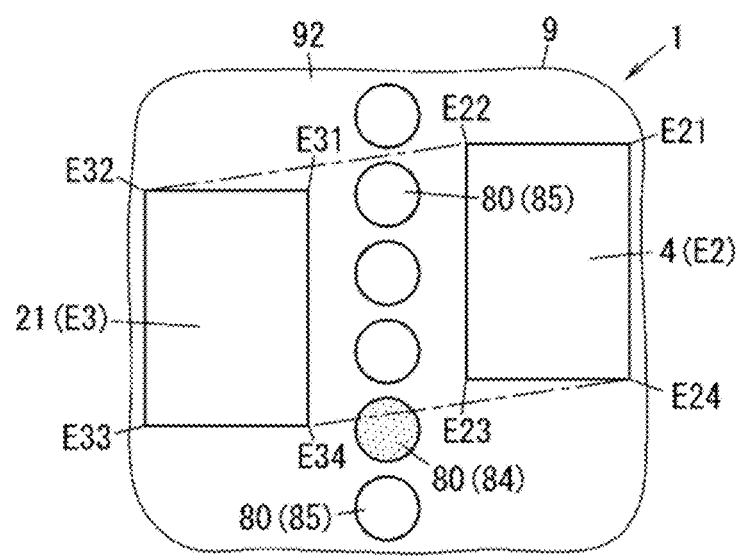
FIG. 3 is a partially cutaway bottom view of a modification of the radio frequency module.
Figure 4:
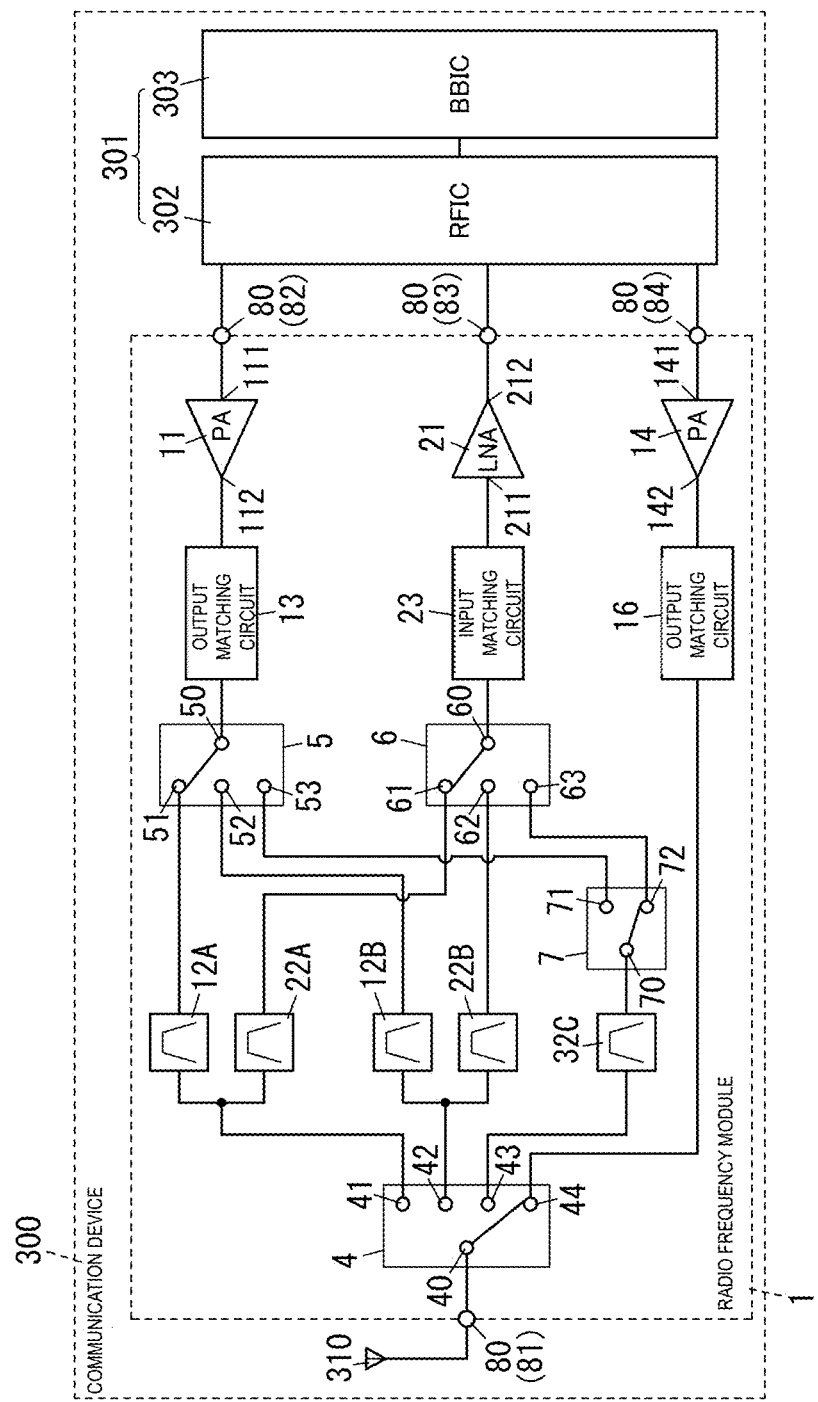
FIG. 4 is a circuit configuration diagram of a communication device including the radio frequency module.

The four external connection terminals 80 are arranged between the second circuit element E2 (first switch 4) and the third circuit element E3 (low-noise amplifier 21) in the radio frequency module 1. The four external connection terminals 80 are oriented intersecting (orthogonal to, for example) the direction in which the second circuit element E2 and the third circuit element E3 are arranged in a plan view from the thickness direction D1 of the mounting substrate 9 (see FIG. 3). The four external connection terminals 80 include the three ground terminals 85 (second group of the ground terminals 85) and one second signal input terminal 84 (see FIG. 1 and FIG. 3). The signal terminal positioned between the second circuit element E2 and the third circuit element E3 is the signal input terminal 84, and is a terminal provided in the signal path for GSM (registered trademark). However, not limited thereto, and the signal terminal may be a terminal provided in a path other than the signal path for LTE. It is sufficient that at least a part of the signal input terminal 84 is positioned within the outer periphery of the substantially smallest convex polygon including four corners E21, E22, E23, and E24 (see FIG. 3) of the second circuit element E2, and four corners E31, E32, E33, and E34 of the third circuit element E3 in a plan view from the thickness direction D1 of the mounting substrate 9. An example of the positioning is illustrated in FIG. 3. In FIG. 3, of the outer periphery of the substantially convex polygon, each of a line connecting one corner E22 of the second circuit element E2 and one corner E32 of the third circuit element E3, and a line connecting another corner E24 of the second circuit element E2 and another corner E34 of the third circuit element E3 is indicated by a dashed-and-dotted line. The size of the second circuit element E2 and the size of the third circuit element E3 may be the same or different from each other in a plan view from the thickness direction D1 of the mounting substrate 9.

The radio frequency module 1 further includes a resin layer 101 on the side of the first main surface 91 of the mounting substrate 9. The resin layer 101 covers electronic components such as the first power amplifier 11 and the second power amplifier 14 mounted on the first main surface 91 of the mounting substrate 9. The resin layer 101 may contain a filler in addition to resin.

2. Summary 2.1. Radio Frequency Module

The radio frequency module 1 according to the embodiment includes the mounting substrate 9, the first circuit element E1 (second power amplifier 14), the second circuit element E2 (first switch 4), the third circuit element E3 (low-noise amplifier 21), and the plurality of external connection terminals 80. The mounting substrate 9 has the first main surface 91 and the second main surface 92 opposed to each other. The first circuit element E1 is mounted on the first main surface 91 of the mounting substrate 9. The second circuit element E2 is mounted on the second main surface 92 of the mounting substrate 9 and is provided in the signal path for a transmission signal. The third circuit element E3 is mounted on the second main surface 92 of the mounting substrate 9 and is provided in the signal path for a reception signal. The plurality of external connection terminals 80 is arranged on the second main surface 92 of the mounting substrate 9. The plurality of external connection terminals 80 includes the ground terminal 85 positioned between the second circuit element E2 and the third circuit element E3 in a plan view from the thickness direction D1 of the mounting substrate 9.

In the radio frequency module 1 according to the embodiment, it is possible to improve the isolation between the second circuit element E2 and the third circuit element E3, in a case in which the second circuit element E2 provided in the signal path for a transmission signal and the third circuit element E3 provided in the signal path for a reception signal are mounted on the second main surface 92 of the mounting substrate 9.

In the radio frequency module 1 according to the embodiment, the first circuit element E1 (second power amplifier 14) passes a radio frequency signal of the first frequency band including the communication band of the first communication standard (2G standard). The transmission signal is a radio frequency signal of the second frequency band including the communication band of the second communication standard (4G standard or 5G standard) different from the first communication standard. The reception signal is a radio frequency signal of the second frequency band including the communication band of the second communication standard. The plurality of external connection terminals 80 includes the signal terminal (signal input terminal 84) electrically connected to the first circuit element E1. The signal terminal (signal input terminal 84) is positioned between the second circuit element E2 and the third circuit element E3. With this, in the radio frequency module 1 according to the embodiment, as compared with the case in which the signal terminal (signal input terminal 84) is not positioned between the second circuit element E2 and the third circuit element E3, there is increased the flexibility in layout of the signal terminal (signal input terminal 82, signal output terminal 83, or the like, for example) related to the second communication standard among the plurality of external connection terminals 80, and other circuit elements mounted on the second main surface 92 of the mounting substrate 9 other than the second circuit element E2 and the third circuit element E3. This makes it possible to improve the isolation while reducing the radio frequency module 1 in size.

In the radio frequency module 1 according to the embodiment, the plurality of external connection terminals 80 includes the antenna terminal 81. The second circuit element E2 is an antenna switch (first switch 4). The antenna switch (first switch 4) has the common terminal 40 that is electrically connected to the antenna terminal 81 and through which a transmission signal and a reception signal pass. The third circuit element E3 is the low-noise amplifier 21. Accordingly, the radio frequency module 1 according to the embodiment may improve the isolation between the antenna switch (first switch 4) and the low-noise amplifier 21, in a case in which the antenna switch (first switch 4) and the low-noise amplifier 21 are mounted on the second main surface 92 of the mounting substrate 9.

In the radio frequency module 1 according to the embodiment, a footprint of the first power amplifier 11 and a footprint of the low-noise amplifier 21 do not overlap with each other in a plan view from the thickness direction D1 of the mounting substrate 9. With this, the isolation between the first power amplifier 11 and the low-noise amplifier 21 may be improved. Further, in the radio frequency module 1 according to the embodiment, the isolation between the first power amplifier 11 and the low-noise amplifier 21 may further be improved since a ground layer positioned between the first power amplifier 11 and the low-noise amplifier 21 is provided to the mounting substrate 9. The ground layer is electrically connected to at least one of the plurality of ground terminals 85, for example. In the radio frequency module 1, the plurality of ground terminals 85 and the ground layer are electrically connected to each other using such as a via conductor included in the mounting substrate 9.

2.2. Communication Device

The communication device 300 according to the embodiment includes the radio frequency module 1 and the signal processing circuit 301 that processes a transmission signal transmitted by the radio frequency module 1 and a reception signal received by the radio frequency module 1. With this, in the communication device 300 according to the embodiment, it is possible to improve the isolation between the second circuit element E2 (first switch 4) and the third circuit element E3, in a case in which the second circuit element E2 provided in the signal path for a transmission signal and the third circuit element E3 provided in the signal path for a reception signal are mounted on the second main surface 92 of the mounting substrate 9.

3. Modified Example of Radio Frequency Module

Figure 5:
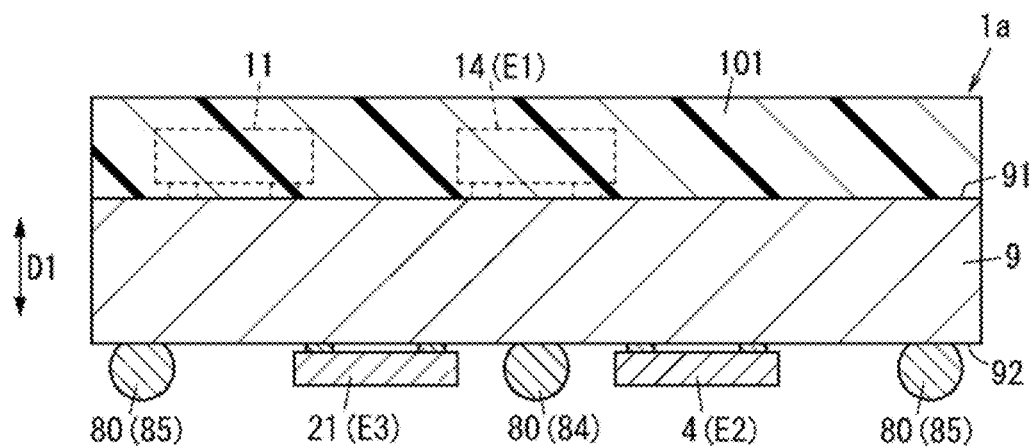
FIG. 5 is a sectional view of a radio frequency module according to Modification 1 of the embodiment.

A radio frequency module 1a according to Modification 1 of the embodiment will be described with reference to FIG. 5. With respect to the radio frequency module 1a according to Modification 1, the same constituents as those of the radio frequency module 1 according to the embodiment are denoted by the same reference numerals, and the description thereof will be omitted.

The radio frequency module 1a according to Modification 1 is different from the radio frequency module 1 according to the embodiment in that the first power amplifier 11 and the second power amplifier 14 are different IC chips from each other.

The first power amplifier 11 is a one-chip IC chip including a substrate having a first main surface (front surface) and a second main surface (back surface) opposed to each other, and an amplification function unit, which is formed on the side of the first main surface of the substrate, including at least one transistor, for example. The substrate is a gallium arsenide substrate, for example. The amplification function unit has a function of amplifying a transmission signal. The transistor is an HBT, for example. The first power amplifier 11 may include a DC cut capacitor in addition to the amplification function unit, for example. The first power amplifier 11 is flip-chip mounted on the first main surface 91 of the mounting substrate 9 such that, of the first main surface and the second main surface, the first main surface of the substrate faces the first main surface 91 of the mounting substrate 9. The outer peripheral shape of the first power amplifier 11 is a substantially quadrilateral shape in a plan view from the thickness direction D1 of the mounting substrate 9.

The second power amplifier 14 is a one-chip IC chip including a substrate having a first main surface (front surface) and a second main surface (back surface) opposed to each other, and an amplification function unit, which is formed on the side of the first main surface of the substrate, including at least one transistor, for example. The substrate is a gallium arsenide substrate, for example. The amplification function unit has a function of amplifying a transmission signal. The transistor is an HBT, for example. The second power amplifier 14 may include a DC cut capacitor in addition to the amplification function unit, for example. The second power amplifier 14 is flip-chip mounted on the first main surface 91 of the mounting substrate 9 such that, of the first main surface and the second main surface, the first main surface of the substrate faces the first main surface 91 of the mounting substrate 9. The outer peripheral shape of the second power amplifier 14 is a substantially quadrilateral shape in a plan view from the thickness direction D1 of the mounting substrate 9.

In the radio frequency module 1a according to Modification 1, the first power amplifier 11 and the second power amplifier 14 are formed of different IC chips from each other. This increases the flexibility in layout of each of the first power amplifier 11 and the second power amplifier 14 on the mounting substrate 9.

Figure 6:
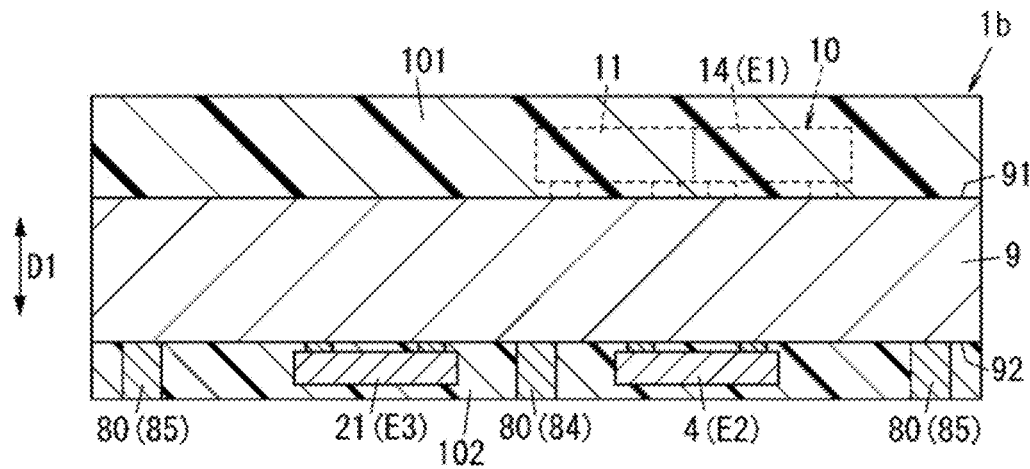
FIG. 6 is a sectional view of a radio frequency module according to Modification 2 of the embodiment.

Next, a radio frequency module 1b according to Modification 2 of the embodiment will be described with reference to FIG. 6. With respect to the radio frequency module 1b according to Modification 2, the same constituents as those of the radio frequency module 1 according to the embodiment are denoted by the same reference numerals, and the description thereof will be omitted.

The radio frequency module 1b according to Modification 2 is different from the radio frequency module 1 according to the embodiment in that each of the plurality of external connection terminals 80 is a columnar electrode. Here, the columnar electrode is an electrode having a substantially columnar shape, for example. The material of the plurality of external connection terminals 80 is metal (such as copper, copper alloy, or the like), for example. Each of the plurality of external connection terminals 80 has a base end portion bonded to the second main surface 92 of the mounting substrate 9 and a tip end portion opposite to the base end portion in the thickness direction D1 of the mounting substrate 9. The tip end portion of each of the plurality of external connection terminals 80 may include a gold plating layer, for example.

The radio frequency module 1b according to Modification 2 further includes a resin layer 102 on the side of the second main surface 92 of the mounting substrate 9. The resin layer 102 covers circuit elements such as the first switch 4 (second circuit element E2) and the low-noise amplifier 21 (third circuit element E3) mounted on the second main surface 92 of the mounting substrate 9. The resin layer 102 is not limited to the case of covering the second main surface of the substrate of each of the circuit elements in a group including such as the first switch 4 and the low-noise amplifier 21. The resin layer 102 may be formed such that the second main surface of the substrate of each of the circuit elements in the group, which is mounted on the second main surface 92 of the mounting substrate 9, is exposed, for example. The resin layer 102 may contain a filler in addition to resin. The material of the resin layer 102 may be the same as or different from the material of the resin layer 101.

Figure 7:
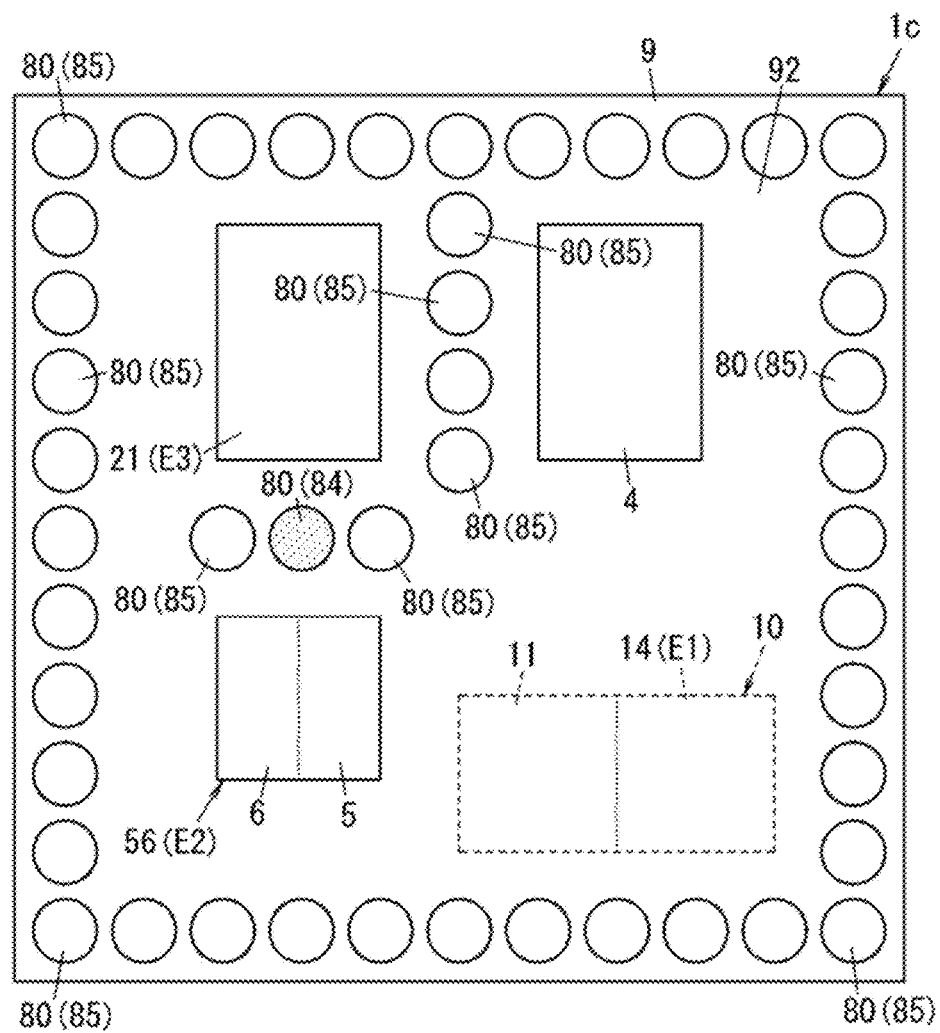
FIG. 7 is a bottom view of a radio frequency module according to Modification 3 of the embodiment.

Next, a radio frequency module 1c according to Modification 3 of the embodiment will be described with reference to FIG. 7. With respect to the radio frequency module 1c according to Modification 3, the same constituents as those of the radio frequency module 1 according to the embodiment are denoted by the same reference numerals, and the description thereof will be omitted.

The radio frequency module 1c according to Modification 3 is different from the radio frequency module 1 according to the embodiment in that a fifth switch 56 (hereinafter also referred to as a band select switch 56), in which the second switch 5 and the third switch 6 are integrated into one chip, constitutes the second circuit element E2.

The band select switch 56 includes the two common terminals 50 and 60, the three selection terminals 51 to 53, and the three selection terminals 61 to 63. The band select switch 56 is a switch IC. More specifically, the band select switch 56 is a one chip IC chip including a substrate having a first main surface (front surface) and a second main surface (back surface) opposed to each other, and a switch function unit, which is formed on the side of the first main surface of the substrate, including a field effect transistor (FET), for example. The substrate is a silicon substrate, for example. The switch function unit has a function of switching a coupling state. The band select switch 56 is flip-chip mounted on the second main surface 92 of the mounting substrate 9 such that, of the first main surface and the second main surface, the first main surface of the substrate faces the second main surface 92 of the mounting substrate 9. The outer peripheral shape of the band select switch 56 is a substantially quadrilateral shape in a plan view from the thickness direction D1 of the mounting substrate 9.

In the radio frequency module 1c according to Modification 3, the band select switch 56 is mounted on the second main surface 92 of the mounting substrate 9 and constitutes the second circuit element E2 provided in the signal path for a transmission signal. Here, since the band select switch 56 includes the second switch 5 and the third switch 6, the band select switch 56 is provided in both the signal path for a transmission signal and the signal path for a reception signal. In the radio frequency module 1, the band select switch 56 is provided in the signal path for a transmission signal in which the first power amplifier 11, the first output matching circuit 13, and the transmission filter 12A are provided. The band select switch 56 is provided in the signal path for a transmission signal in which the first power amplifier 11, the first output matching circuit 13, and the transmission filter 12B are provided. The band select switch 56 is provided in the signal path for a transmission signal in which the first power amplifier 11, the first output matching circuit 13, the fourth switch 7, and the transmission/reception filter 32C are provided. The band select switch 56 is provided in the signal path for a reception signal in which the reception filter 22A, the input matching circuit 23, and the low-noise amplifier 21 are provided. The band select switch 56 is provided in the signal path for a reception signal in which the reception filter 22B, the input matching circuit 23, and the low-noise amplifier 21 are provided. The band select switch 56 is provided in the signal path for a reception signal in which the transmission/reception filter 32C, the fourth switch 7, the input matching circuit 23, and the low-noise amplifier 21 are provided. In the radio frequency module 1c according to Modification 3, the low-noise amplifier 21 is mounted on the second main surface 92 of the mounting substrate 9, and constitutes the third circuit element E3 provided in the signal path for a reception signal.

In the radio frequency module 1c according to Modification 3, the second circuit element E2 is the band select switch 56. The band select switch 56 has a function of switching signal paths for a plurality of transmission signals in mutually different communication bands and a function of switching signal paths for a plurality of reception signals in mutually different communication bands. The third circuit element E3 is the low-noise amplifier 21.

In the radio frequency module 1c according to Modification 3, the ground terminal 85 is positioned between the second circuit element E2 (band select switch 56) and the third circuit element E3 (low-noise amplifier 21) in a plan view from the thickness direction D1 of the mounting substrate 9. With this, in the radio frequency module 1c according to Modification 3, it is possible to improve the isolation between the second circuit element E2 (band select switch 56) and the third circuit element E3 (low-noise amplifier 21), in a case in which the second circuit element E2 provided in the signal path for a transmission signal and the third circuit element E3 provided in the signal path for a reception signal are mounted on the second main surface 92 of the mounting substrate 9. Further, in the radio frequency module 1c according to Modification 3, as in the radio frequency module 1 according to the embodiment, it is possible to improve the isolation between the first switch 4 and the low-noise amplifier 21, in a case in which the first switch 4 provided in the signal path for a transmission signal and the low-noise amplifier 21 provided in the signal path for a reception signal are mounted on the second main surface 92 of the mounting substrate 9.

Further, in the radio frequency module 1c according to Modification 3, the signal terminal (signal input terminal 84) is positioned between the second circuit element E2 (band select switch 56) and the third circuit element E3 (low-noise amplifier 21). With this, in the radio frequency module 1c according to Modification 3, as compared with the case in which the signal terminal (signal input terminal 84) is not positioned between the second circuit element E2 and the third circuit element E3, there is increased the flexibility in layout of the signal terminal (signal input terminal 82, signal output terminal 83, or the like, for example) related to the second communication standard among the plurality of external connection terminals 80, and other circuit elements mounted on the second main surface 92 of the mounting substrate 9 other than the second circuit element E2 and the third circuit element E3. This makes it possible to improve the isolation while reducing the radio frequency module 1c in size.

In the radio frequency module 1c according to Modification 3, in a case in which the substrate of each of the band select switch 56 and the low-noise amplifier 21 is a silicon substrate, for example, each substrate of the band select switch 56 and the low-noise amplifier 21, which are flip-chip mounted on the second main surface 92 of the mounting substrate 9, may easily be ground from the side of the second main surface that is opposite to the first main surface facing the mounting substrate 9, at the time of manufacturing. This makes it possible to reduce the height of the radio frequency module 1c.

Figure 8:
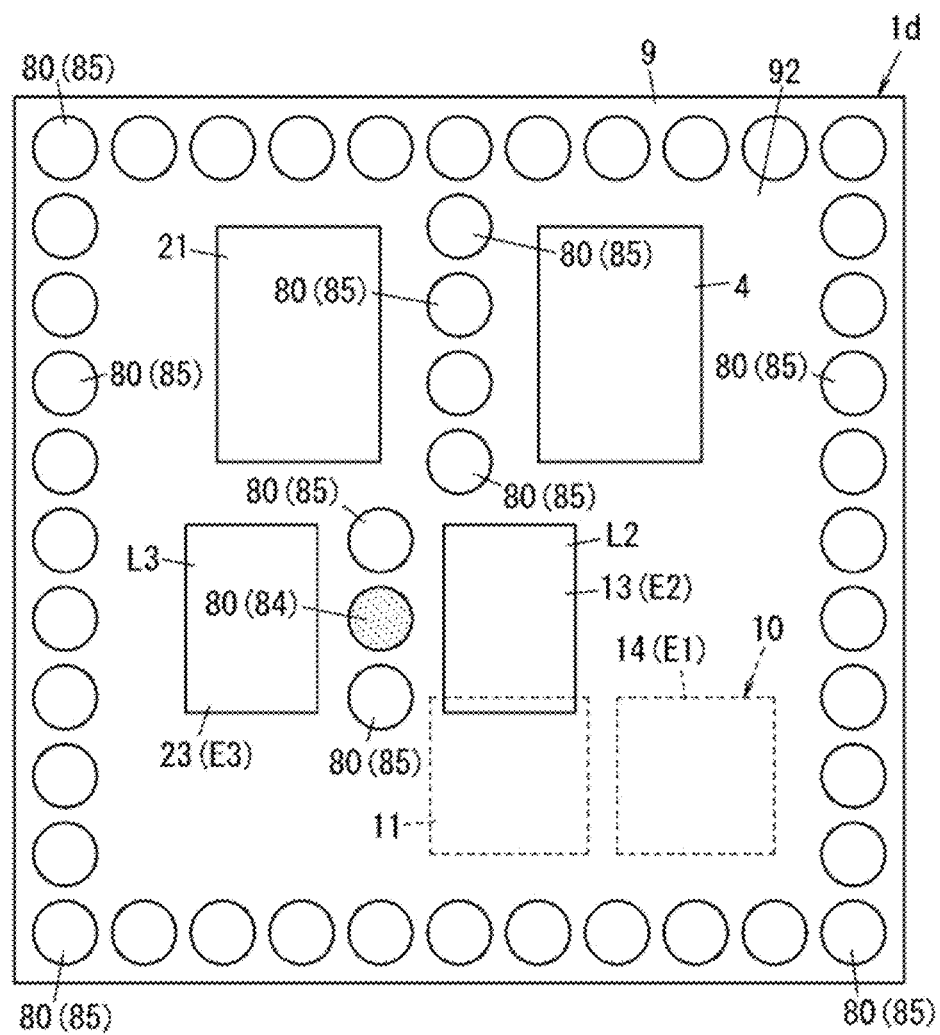
FIG. 8 is a bottom view of a radio frequency module according to Modification 4 of the embodiment.

Next, a radio frequency module 1d according to Modification 4 of the embodiment will be described with reference to FIG. 8. With respect to the radio frequency module 1d according to Modification 4, the same constituents as those of the radio frequency module 1 according to the embodiment are denoted by the same reference numerals, and the description thereof will be omitted.

In the radio frequency module 1d according to Modification 4, an inductor L2 included in the output matching circuit 13 and an inductor L3 included in the input matching circuit 23 are mounted on the second main surface 92 of the mounting substrate 9. The radio frequency module 1d according to Modification 4 is different from the radio frequency module 1 according to the embodiment in that the inductor L2 included in the output matching circuit 13 constitutes the second circuit element E2 and the inductor L3 included in the input matching circuit 23 constitutes the third circuit element E3.

Each of the inductor L2 and the inductor L3 is a chip inductor, for example. The outer peripheral shape of each of the inductor L2 and the inductor L3 is a substantially quadrilateral shape in a plan view from the thickness direction D1 of the mounting substrate 9.

In the radio frequency module 1d according to Modification 4, the inductor L2 included in the output matching circuit 13 is provided in the signal path for a transmission signal in which the first power amplifier 11, the second switch 5, and the transmission filter 12A are provided. The inductor L2 is provided in the signal path for a transmission signal in which the first power amplifier 11, the second switch 5, and the transmission filter 12B are provided. The inductor L2 is provided in the signal path for a transmission signal in which the first power amplifier 11, the second switch 5, the fourth switch 7, and the transmission/reception filter 32C are provided. The inductor L3 included in the input matching circuit 23 is provided in the signal path for a reception signal in which the reception filter 22A, the third switch 6, and the low-noise amplifier 21 are provided. The inductor L3 is provided in the signal path for a reception signal in which the reception filter 22B, the third switch 6, and the low-noise amplifier 21 are provided. The inductor L3 is provided in the signal path for a reception signal in which the transmission/reception filter 32C, the fourth switch 7, the third switch 6, and the low-noise amplifier 21 are provided.

In the radio frequency module 1*d* according to Modification 4, the ground terminal 85 is positioned between the second circuit element E2 (inductor L2) and the third circuit element E3 (inductor L3). With this, in the radio frequency module 1*d* according to Modification 4, it is possible to improve the isolation between the second circuit element E2 (inductor L2) and the third circuit element E3 (inductor L3), in a case in which the second circuit element E2 provided in the signal path for a transmission signal and the third circuit element E3 provided in the signal path for a reception signal are mounted on the second main surface 92 of the mounting substrate 9. In the radio frequency module 1*d* according to Modification 4, as in the radio frequency module 1 according to the embodiment, it is possible to improve the isolation between the first switch 4 and the low-noise amplifier 21, in a case in which the first switch 4 provided in the signal path for a transmission signal and the low-noise amplifier 21 provided in the signal path for a reception signal are mounted on the second main surface 92 of the mounting substrate 9.

In the radio frequency module 1*d* according to Modification 4, a part of a footprint of the inductor L2 and a part of the footprint of the first power amplifier 11 overlap with each other in a plan view from the thickness direction D1 of the mounting substrate 9. With this, in the radio frequency module 1*d* according to Modification 4, the length of a wiring line connecting the first power amplifier 11 and the inductor L2 included in the output matching circuit 13 may be made shorter than in the case in which the footprint of the inductor L2 and the footprint of the first power amplifier 11 do not overlap with each other in a plan view from the thickness direction D1 of the mounting substrate 9.

In the radio frequency module 1*d* according to Modification 4, the signal terminal (signal input terminal 84) is positioned between the second circuit element E2 (inductor L2) and the third circuit element E3 (inductor L3). With this, in the radio frequency module 1*d* according to Modification 4, as compared with the case in which the signal terminal (signal input terminal 84) is not positioned between the second circuit element E2 and the third circuit element E3, there is increased the flexibility in layout of the signal terminal (signal input terminal 82, signal output terminal 83, or the like, for example) related to the second communication standard among the plurality of external connection terminals 80, and other circuit elements mounted on the second main surface 92 of the mounting substrate 9 other than the second circuit element E2 and the third circuit element E3. This makes it possible to improve the isolation while reducing the radio frequency module 1*d* in size.

Figure 9:
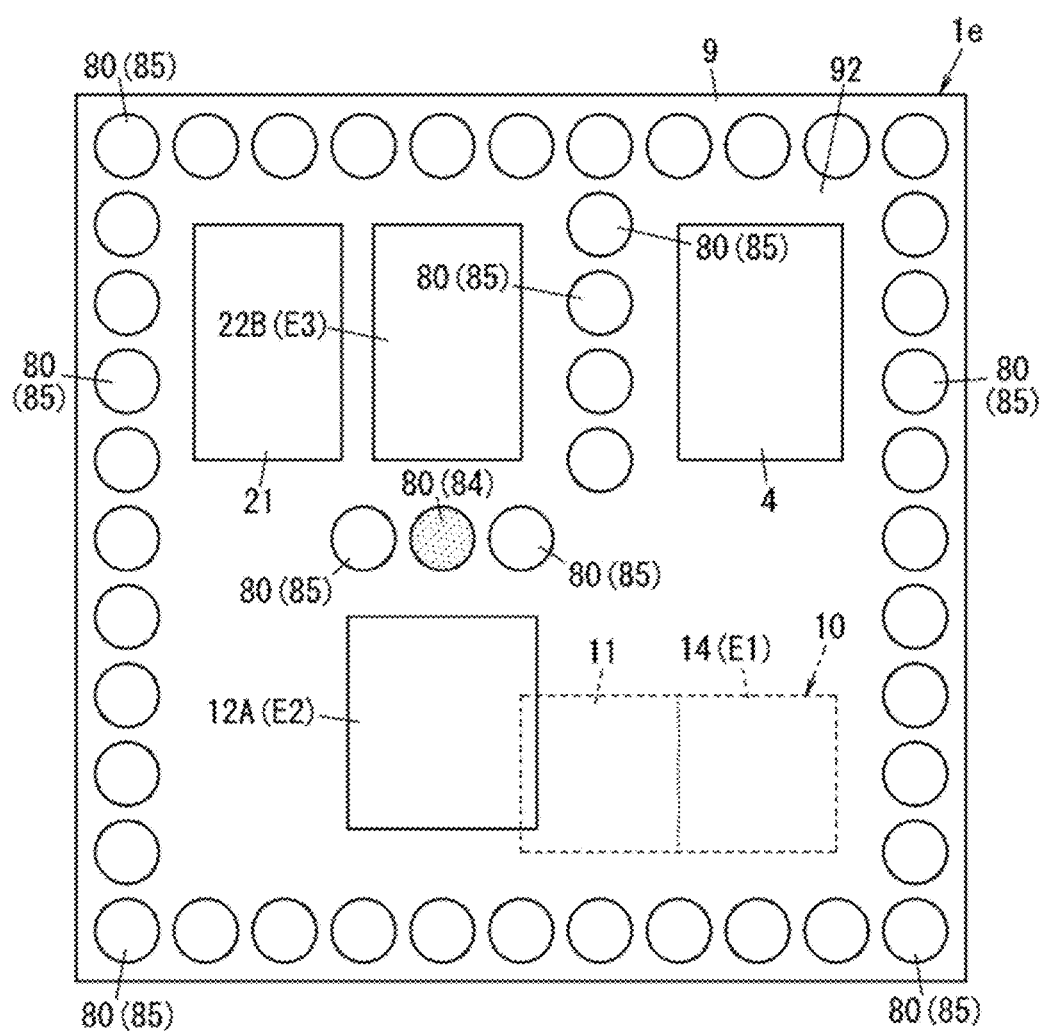
FIG. 9 is a bottom view of a radio frequency module according to Modification 5 of the embodiment.

Next, a radio frequency module 1*e* according to Modification 5 of the embodiment will be described with reference to FIG. 9. With respect to the radio frequency module 1*e* according to Modification 5, the same constituents as those of the radio frequency module 1 according to the embodiment are denoted by the same reference numerals, and the description thereof will be omitted.

In the radio frequency module 1*e* according to Modification 5, the transmission filter 12A and the reception filter 22B are mounted on the second main surface 92 of the mounting substrate 9. The radio frequency module 1*e* according to Modification 5 is different from the radio frequency module 1 according to the embodiment in that the transmission filter 12A constitutes the second circuit element E2 and the reception filter 22B constitutes the third circuit element E3.

In the radio frequency module 1*e* according to Modification 5, the transmission filter 12A is provided in the signal path for a transmission signal in which the first power amplifier 11, the output matching circuit 13, and the second switch 5 are provided. The reception filter 22B is provided in the signal path for a reception signal in which the third switch 6, the input matching circuit 23, and the low-noise amplifier 21 are provided.

In the radio frequency module 1*e* according to Modification 5, the ground terminal 85 is positioned between the second circuit element E2 (transmission filter 12A) and the third circuit element E3 (reception filter 22B). With this, in the radio frequency module 1*e* according to Modification 5, it is possible to improve the isolation between the second circuit element E2 (transmission filter 12A) and the third circuit element E3 (reception filter 22B), in a case in which the second circuit element E2 provided in the signal path for a transmission signal and the third circuit element E3 provided in the signal path for a reception signal are mounted on the second main surface 92 of the mounting substrate 9.

In the radio frequency module 1*e* according to Modification 5, the ground terminal 85 is positioned between the first switch 4 and the reception filter 22B. With this, in the radio frequency module 1*e* according to Modification 5, it is possible to improve the isolation between the first switch 4 and the reception filter 22B, in a case in which the first switch 4 provided in the signal path for a transmission signal and the reception filter 22B provided in the signal path for a reception signal are mounted on the second main surface 92 of the mounting substrate 9.

In the radio frequency module 1*e* according to Modification 5, the signal terminal (signal input terminal 84) is positioned between the second circuit element E2 (transmission filter 12A) and the third circuit element E3 (reception filter 22B). With this, in the radio frequency module 1*e* according to Modification 5, as compared with the case in which the signal terminal (signal input terminal 84) is not positioned between the second circuit element E2 and the third circuit element E3, there is increased the flexibility in layout of the signal terminal (signal input terminal 82, signal output terminal 83, or the like, for example) related to the second communication standard among the plurality of external connection terminals 80, and other circuit elements mounted on the second main surface 92 of the mounting substrate 9 other than the second circuit element E2 and the third circuit element E3. This makes it possible to improve the isolation while reducing the radio frequency module 1*e* in size.

Figure 10:
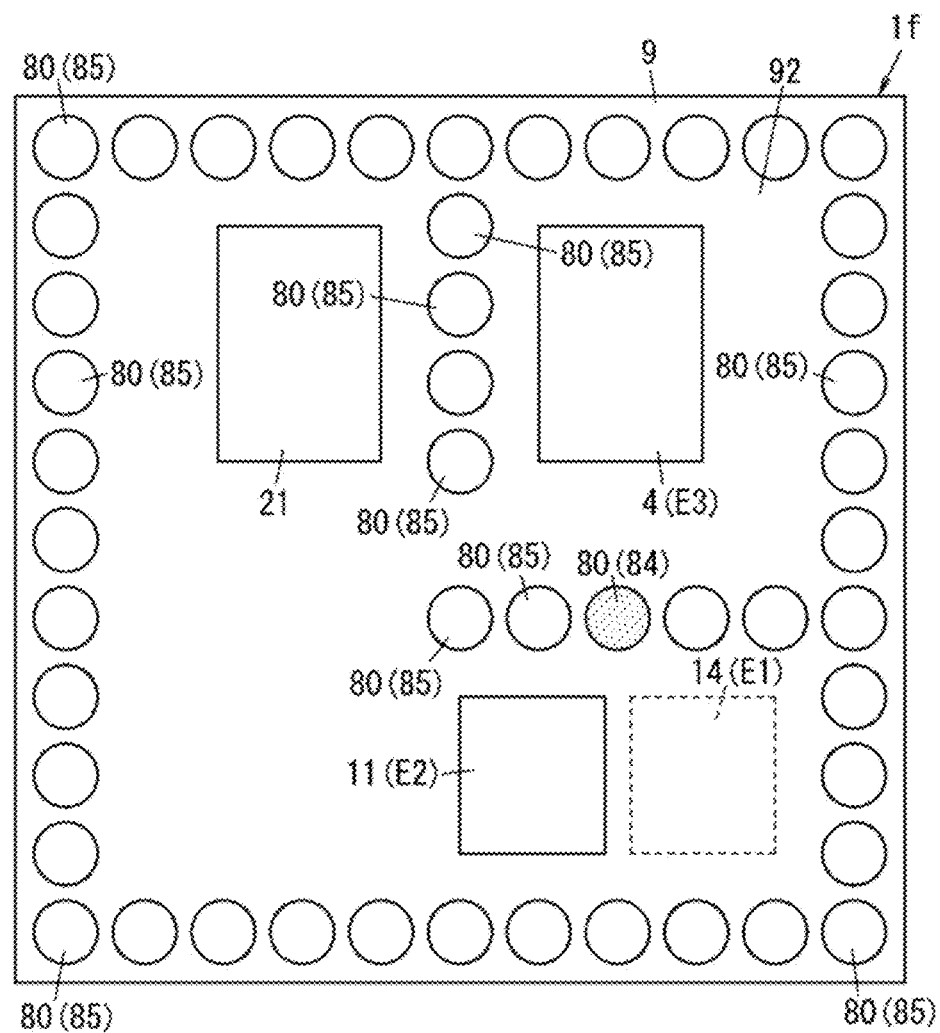
FIG. 10 is a bottom view of a radio frequency module according to Modification 6 of the embodiment.

Next, a radio frequency module 1*f* according to Modification 6 of the embodiment will be described with reference to FIG. 10. With respect to the radio frequency module 1*f* according to Modification 6, the same constituents as those of the radio frequency module 1 according to the embodiment are denoted by the same reference numerals, and the description thereof will be omitted.

In the radio frequency module 1*f* according to Modification 6, the first power amplifier 11 is mounted on the second main surface 92 of the mounting substrate 9. The radio frequency module 1*f* according to Modification 6 is different from the radio frequency module 1 according to the embodiment in that the first power amplifier 11 constitutes the second circuit element E2 and the first switch 4 constitutes the third circuit element E3.

In the radio frequency module 1*f* according to Modification 6, the ground terminal 85 is positioned between the second circuit element E2 (first power amplifier 11) and the third circuit element E3 (first switch 4). With this, in the radio frequency module 1*f* according to Modification 6, it is possible to improve the isolation between the second circuit element E2 (first power amplifier 11) and the third circuit element E3 (first switch 4), in a case in which the second circuit element E2 provided in the signal path for a transmission signal and the third circuit element E3 provided in the signal path for a reception signal are mounted on the second main surface 92 of the mounting substrate 9. In the radio frequency module 1*f* according to Modification 6, the ground terminal 85 is positioned between the first switch 4 and the low-noise amplifier 21 as in the radio frequency module 1 according to the embodiment. With this, in the radio frequency module 1*f* according to Modification 6, it is possible to improve the isolation between the first switch 4 and the low-noise amplifier 21, in a case in which the first switch 4 provided in the signal path for a transmission signal and the low-noise amplifier 21 provided in the signal path for a reception signal are mounted on the second main surface 92 of the mounting substrate 9.

Figure 11:
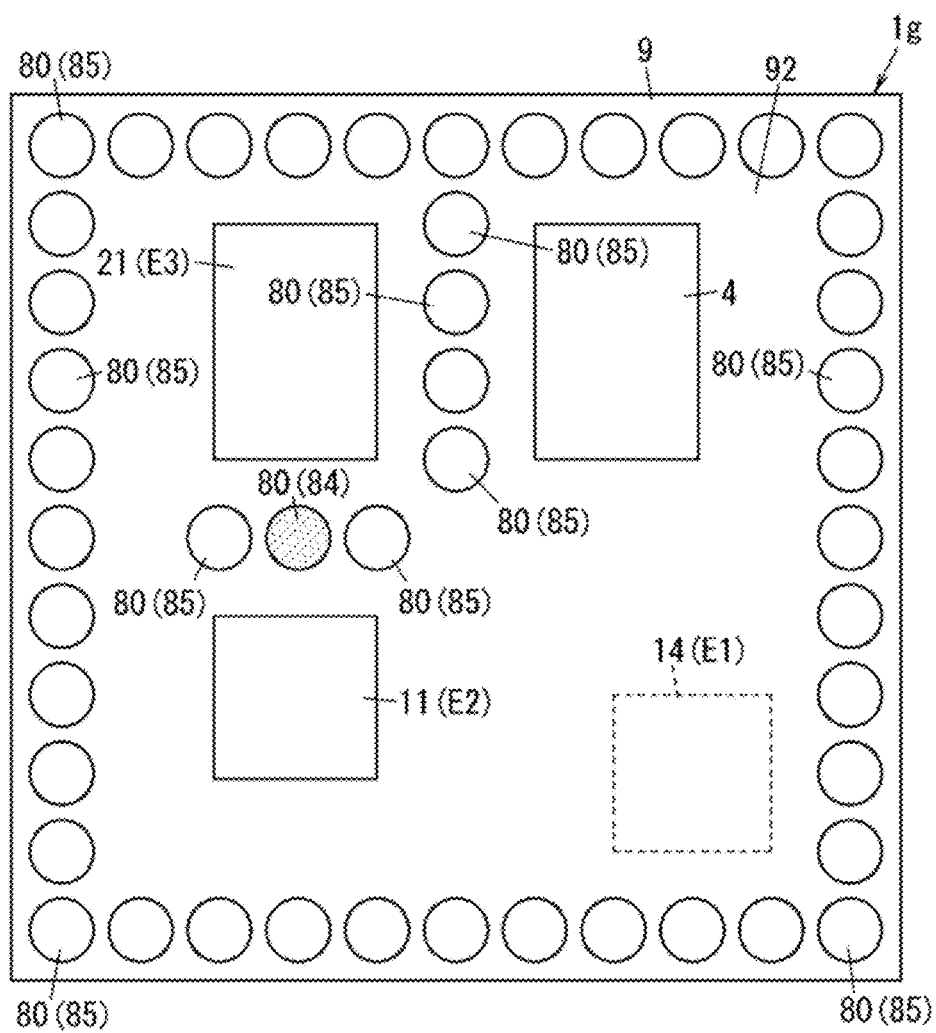
FIG. 11 is a bottom view of a radio frequency module according to Modification 7 of the embodiment.

Next, a radio frequency module 1*g* according to Modification 7 of the embodiment will be described with reference to FIG. 11. With respect to the radio frequency module 1*g* according to Modification 7, the same constituents as those of the radio frequency module 1 according to the embodiment are denoted by the same reference numerals, and the description thereof will be omitted.

In the radio frequency module 1*g* according to Modification 7, the first power amplifier 11 is mounted on the second main surface 92 of the mounting substrate 9. The radio frequency module 1*g* according to Modification 7 is different from the radio frequency module 1 according to the embodiment in that the first power amplifier 11 constitutes the second circuit element E2 and the low-noise amplifier 21 constitutes the third circuit element E3.

In the radio frequency module 1*g* according to Modification 7, the ground terminal 85 is positioned between the second circuit element E2 (first power amplifier 11) and the third circuit element E3 (low-noise amplifier 21). With this, in the radio frequency module 1*g* according to Modification 7, it is possible to improve the isolation between the second circuit element E2 (first power amplifier 11) and the third circuit element E3 (low-noise amplifier 21), in a case in which the second circuit element E2 provided in the signal path for a transmission signal and the third circuit element E3 provided in the signal path for a reception signal are mounted on the second main surface 92 of the mounting substrate 9. In the radio frequency module 1*g* according to Modification 7, the ground terminal 85 is positioned between the first switch 4 and the low-noise amplifier 21, as in the radio frequency module 1 according to the embodiment. With this, in the radio frequency module 1*g* according to Modification 7, it is possible to improve the isolation between the first switch 4 and the low-noise amplifier 21, in a case in which the first switch 4 provided in the signal path for a transmission signal and the low-noise amplifier 21 provided in the signal path for a reception signal are mounted on the second main surface 92 of the mounting substrate 9.

Figure 12:
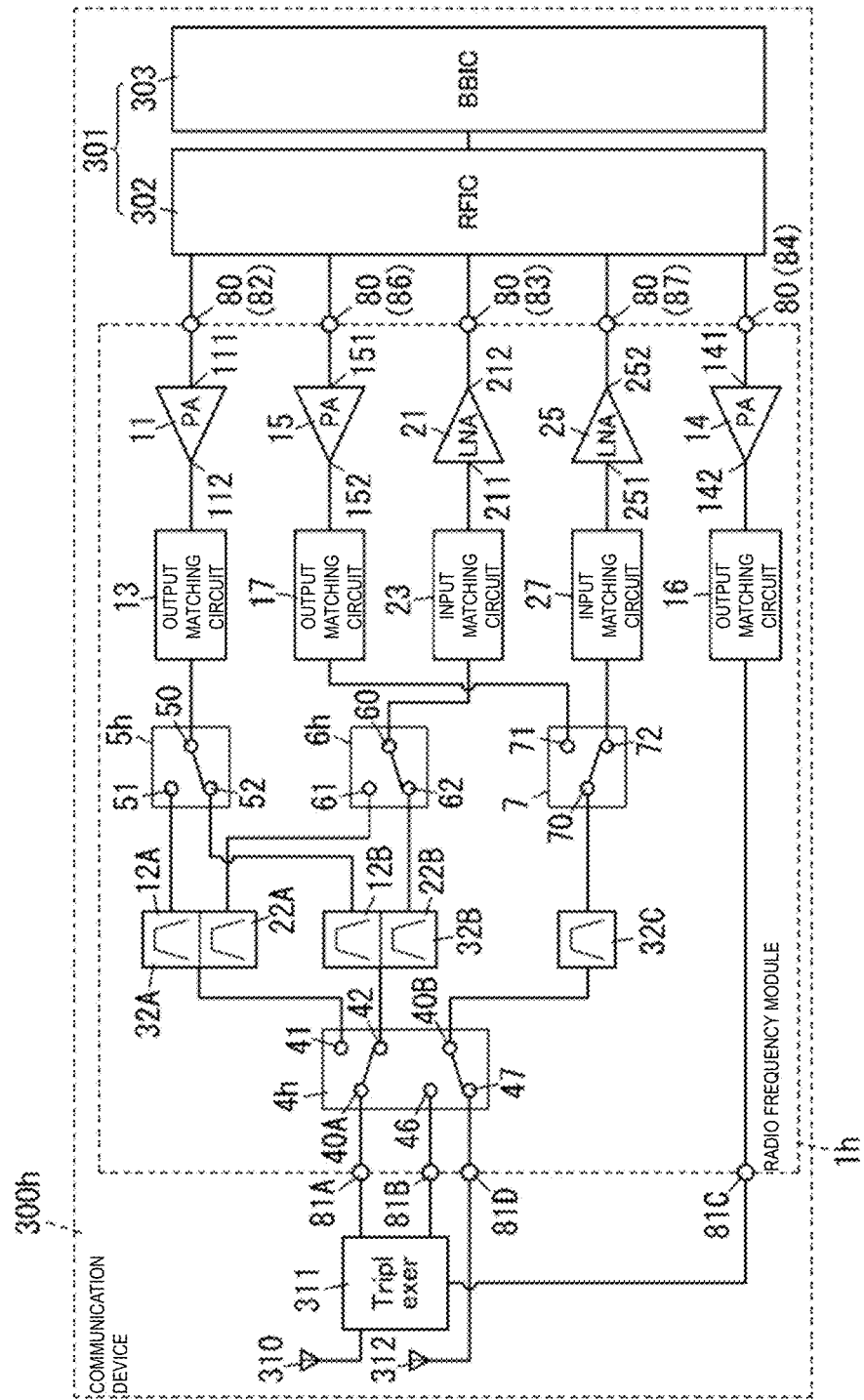
FIG. 12 is a circuit configuration diagram of a communication device including a radio frequency module according to Modification 8 of the embodiment.

Next, a radio frequency module 1*h* and a communication device 300*h* according to Modification 8 of the embodiment will be described with reference to FIG. 12. With respect to the radio frequency module 1*h* and the communication device 300*h* according to Modification 8, the same constituents as those in each of the radio frequency module 1 and the communication device 300 according to the embodiment are denoted by the same reference numerals, and the description thereof will be omitted.

The radio frequency module 1*h* according to Modification 8 includes a first switch 4*h*, a second switch 5*h*, and a third switch 6*h* instead of each of the first switch 4, the second switch 5, and the third switch 6 in the radio frequency module 1 according to the embodiment.

Further, the radio frequency module 1*h* according to Modification 8 includes a one-chip duplexer 32A including the transmission filter 12A and the reception filter 22A in the radio frequency module 1 according to the embodiment, and a one-chip duplexer 32B including the transmission filter 12B and the reception filter 22B in the radio frequency module 1 according to the embodiment. Each of the two duplexers 32A and 32B has an antenna side terminal, a transmission terminal, and a reception terminal.

In the radio frequency module 1*h* according to Modification 8, the plurality of external connection terminals 80 includes a signal input terminal 86 and a signal output terminal 87 in addition to the signal input terminal 82 and the signal output terminal 83 of the radio frequency module 1 according to the embodiment. The signal input terminal 86 and the signal output terminal 87, as same as the signal input terminal 82 and the signal output terminal 83, are connected to the signal processing circuit 301 in the communication device 300*h*. The radio frequency module 1*h* according to Modification 8 further includes a power amplifier 15 (hereinafter also referred to as a third power amplifier 15), an output matching circuit 17 (hereinafter also referred to as a third output matching circuit 17), a low-noise amplifier 25, and an input matching circuit 27.

In the radio frequency module 1*h* according to Modification 8, the plurality of external connection terminals 80 includes four antenna terminals 81A, 81B, 81C, and 81D instead of the antenna terminal 81 of the radio frequency module 1 according to the embodiment.

The communication device 300*h* further includes a triplexer 311. The triplexer 311 is provided between the radio frequency module 1*h* and the antenna 310. The triplexer 311 is connected to the three antenna terminals 81A, 81B, and 81C of the radio frequency module 1*h*. The triplexer 311 is connected to the antenna 310.

The communication device 300*h* further includes a second antenna 312 separated from the antenna 310. The second antenna 312 is connected to the antenna terminal 81D of the radio frequency module 1*h*.

Hereinafter, each constituent of the radio frequency module 1*h* according to Modification 8 will be described.

The first switch 4*h* includes two common terminals 40A and 40B, the two selection terminals 41 and 42, and two selection terminals 46 and 47. The first switch 4*h* has the above-described two common terminals 40A and 40B in order to support both frequency division duplex (FDD) and TDD.

The common terminal 40A is connected to the antenna terminal 81A. The selection terminal 41 is connected to the antenna side terminal of the duplexer 32A. The selection terminal 42 is connected to the antenna side terminal of the duplexer 32B.

The common terminal 40B is connected to the transmission/reception filter 32C. The selection terminal 46 is connected to the antenna terminal 81B. The selection terminal 47 is connected to the antenna terminal 81D.

The second switch 5h is different from the second switch 5 in that the selection terminal 53 of the second switch 5 is not provided. The second switch 5h is provided in order to support FDD. The common terminal 50 of the second switch 5h is connected to the output matching circuit 13. The selection terminal 51 of the second switch 5h is connected to the transmission terminal (input terminal of the transmission filter 12A) of the duplexer 32A. The selection terminal 52 of the second switch 5h is connected to the transmission terminal (input terminal of the transmission filter 12B) of the duplexer 32B.

The third switch 6h is different from the third switch 6 in that the selection terminal 63 of the third switch 6 is not provided. The third switch 6h is provided in order to support FDD. The common terminal 60 of the third switch 6h is connected to the input matching circuit 23. The selection terminal 61 of the third switch 6h is connected to the reception terminal (output terminal of the reception filter 22A) of the duplexer 32A. The selection terminal 62 of the third switch 6h is connected to the reception terminal (output terminal of the reception filter 22B) of the duplexer 32B.

The first power amplifier 11 amplifies a transmission signal of the second frequency band (here, the first communication band and the second communication band) inputted to the input terminal 111, and outputs the amplified signal from the output terminal 112. The first communication band is Band11 of the 3GPP LTE standard, for example. Further, the second communication band is Band22 of the 3GPP LTE standard, for example.

The third power amplifier 15 has an input terminal 151 and an output terminal 152. The input terminal 151 of the third power amplifier 15 is connected to the signal input terminal 86. The output terminal 152 of the third power amplifier 15 is connected to the third output matching circuit 17. The third power amplifier 15 amplifies a transmission signal of the second frequency band (here, the third communication band) inputted to the input terminal 151, and outputs the amplified signal from the output terminal 152. The third communication band is Band42 and Band48 of the 3GPP LTE standard, or n77 of the 5G NR standard, for example.

The low-noise amplifier 21 amplifies the reception signal of the second frequency band (here, the first communication band and the second communication band) inputted to the input terminal 211, and outputs the amplified signal from the output terminal 212.

The low-noise amplifier 25 has an input terminal 251 and an output terminal 252. The low-noise amplifier 25 amplifies the reception signal of the second frequency band (here, the third communication band) inputted to the input terminal 251, and outputs the amplified signal from the output terminal 252.

The output terminal 142 of the second power amplifier 14 is connected to the antenna terminal 81C via the output matching circuit 16.

The triplexer 311 is not included in the constituents of the radio frequency module 1h in the communication device 300h according to Modification 8, but the triplexer 311 may be included in the radio frequency module 1h. The triplexer 311 may be a multiplexer.

The above-described embodiment is merely one of various embodiments of the present disclosure. The above-described embodiment can be variously modified according to design or the like as long as the object of the present disclosure can be achieved.

For example, the mounting substrate 9 is not limited to the printed wiring board or the LTCC substrate, and may be a high temperature co-fired ceramics (HTCC) substrate, a component built-in substrate, or the like, for example.

The first switch 4, the second switch 5, the third switch 6, the fourth switch 7, and the low-noise amplifier 21 may be configured of separate IC chips as in the radio frequency module 1 of the embodiment, or may be integrated into one chip in any combination.

Each of the radio frequency modules 1 to 1g may include a controller (power amplifier controller) that controls the first power amplifier 11 and the second power amplifier 14 based on a control signal from the signal processing circuit 301. The radio frequency module 1h may include a controller (power amplifier controller) that controls the first power amplifier 11, the second power amplifier 14, and the third power amplifier 15 based on a control signal from the signal processing circuit 301. The controller is a one-chip IC chip including a substrate having a first main surface (front surface) and a second main surface (back surface) opposed to each other, and a control function unit formed on the side of the first main surface of the substrate, for example.

The substrate of each of the first power amplifier 11, the second power amplifier 14, and the third power amplifier 15 is not limited to the gallium arsenide substrate, and may be a silicon substrate, for example. In this case, the transistor included in each of the first power amplifier 11, the second power amplifier 14, and the third power amplifier 15 is not an HBT, but a bipolar transistor.

The number of selection terminals in each of the first switch 4, the second switch 5, the third switch 6, and the fourth switch 7 is not limited to the exemplified number as long as a plural number.

The filter is not limited to the ladder filter, and may be a longitudinally coupled resonator-type surface acoustic wave filter, for example.

The above-described filter is an acoustic wave filter using a surface acoustic wave, but is not limited thereto, and may be an acoustic wave filter using a boundary acoustic wave, a plate wave, or the like, for example.

The filter may be an LC filter. In a case in which the filter is configured of an acoustic wave filter, attenuation characteristics in the vicinity of a pass band may be improved as compared with the case in which the filter is configured of an LC filter. Further, in a case in which the filter is configured of an acoustic wave filter, F (reflection coefficient) in the mid-band may be made larger than in the case in which the filter is configured of an LC filter.

As a circuit configuration, each of the radio frequency modules 1 to 1h may have a radio frequency front-end circuit supporting multi input multi output (MIMO), for example.

The communication device 300 according to the embodiment may include any of the radio frequency modules 1a, 1b, 1c, 1d, 1e, 1f, and 1g instead of the radio frequency module 1.

Aspects

In this specification, the following aspects are disclosed.

The radio frequency module (1; 1a; 1b; 1c; 1d; 1e; 1f; 1g; 1h) according to a first aspect includes the mounting substrate (9), the first circuit element (E1), the second circuit element (E2), the third circuit element (E3), and the plurality of external connection terminals (80). The mounting substrate (9) has the first main surface (91) and the second main surface (92) opposed to each other. The first circuit element (E1) is mounted on the first main surface (91) of the mounting substrate (9). The second circuit element (E2) is mounted on the second main surface (92) of the mounting substrate (9), and is provided in the signal path for a transmission signal. The third circuit element (E3) is mounted on the second main surface (92) of the mounting substrate (9), and is provided in the signal path for a reception signal. The plurality of external connection terminals (80) is arranged on the second main surface (92) of the mounting substrate (9). The plurality of external connection terminals (80) includes the ground terminal (85) positioned between the second circuit element (E2) and the third circuit element (E3) in a plan view from the thickness direction (D1) of the mounting substrate (9).

In the radio frequency module (1; 1a; 1b; 1c; 1d; 1e; 1f; 1g; 1h) according to the first aspect, it is possible to improve the isolation between the second circuit element (E2) and the third circuit element (E3), in a case in which the second circuit element (E2) provided in the signal path for a transmission signal and the third circuit element (E3) provided in the signal path for a reception signal are mounted on the second main surface (92) of the mounting substrate (9).

In the radio frequency module (1; 1a; 1c; 1d; 1e; 1f; 1g; 1h) according to a second aspect, the ground terminal (85) is a bump in the first aspect.

In the radio frequency module (1b) according to a third aspect, the ground terminal (85) is a columnar electrode in the first aspect.

In the radio frequency module (1; 1a; 1b; 1c; 1d; 1e; 1f; 1g; 1h) according to a fourth aspect, the first circuit element (E1) passes a radio frequency signal in the first frequency band of the first communication standard in any one of the first to third aspects. The transmission signal is a radio frequency signal in the second frequency band of the second communication standard different from the first communication standard. The reception signal is a radio frequency signal in the second frequency band of the second communication standard. The plurality of external connection terminals (80) includes the signal terminal (signal input terminal 84) electrically connected to the first circuit element (E1). The signal terminal (signal input terminal 84) is positioned between the second circuit element (E2) and the third circuit element (E3) in a plan view from the thickness direction (D1) of the mounting substrate (9).

In the radio frequency module (1; 1a; 1b; 1h) according to a fifth aspect, the plurality of external connection terminals (80) includes the antenna terminal (81) in any one of the first to fourth aspects. The second circuit element (E2) is the antenna switch (first switch 4; 4h). The antenna switch (first switch 4; 4h) has a common terminal (40; 40A) that is electrically connected to the antenna terminal (81; 81A) and through which a transmission signal and a reception signal pass. The third circuit element (E3) is the low-noise amplifier (21; 25).

In the radio frequency module (1; 1a; 1b; 1h) according to the fifth aspect, in a case in which the substrate of each of the antenna switch (first switch 4; 4h) and the low-noise amplifier (21; 25) is a silicon substrate, for example, each substrate of the antenna switch (first switch 4; 4h) and the low-noise amplifier (21; 25), which are flip-chip mounted on the second main surface (92) of the mounting substrate (9), may easily be ground from the side of the second main surface that is opposite to the first main surface facing the mounting substrate (9), at the time of manufacturing. This makes it possible to reduce the height of the radio frequency module (1; 1a; 1b; 1h).

In the radio frequency module (1c) according to a sixth aspect, the second circuit element (E2) is a band select switch (56) in any one of the first to fourth aspects. The band select switch (56) has a function of switching signal paths for a plurality of transmission signals in mutually different communication bands and a function of switching signal paths for a plurality of reception signals in mutually different communication bands. The third circuit element (E3) is a low-noise amplifier (21).

In the radio frequency module (1c) according to the sixth aspect, in a case in which the substrate of each of the band select switch (56) and the low-noise amplifier (21) is a silicon substrate, for example, each substrate of the band select switch (56) and the low-noise amplifier (21), which are flip-chip mounted on the second main surface (92) of the mounting substrate (9), may easily be ground from the side of the second main surface that is opposite to the first main surface facing the mounting substrate (9), at the time of manufacturing. This makes it possible to reduce the height of the radio frequency module (1c).

The radio frequency module (1d; 1h) according to a seventh aspect further includes the power amplifier (11), the output matching circuit (13), the low-noise amplifier (21), and the input matching circuit (23) in any one of the first to fourth aspects. The power amplifier (11) has the input terminal (111) and the output terminal (112). The output matching circuit (13) is electrically connected to the output terminal (112) of the power amplifier (11). The output matching circuit (13) includes the inductor (L2). The low-noise amplifier (21) has the input terminal (211) and the output terminal (212). The input matching circuit (23) is electrically connected to the input terminal (211) of the low-noise amplifier (21). The input matching circuit (23) includes the inductor (L3). The second circuit element (E2) is the inductor (L2) of the output matching circuit (13). The third circuit element (E3) is the inductor (L3) of the input matching circuit (23).

In the radio frequency module (1e) according to an eighth aspect, the second circuit element (E2) is the transmission filter (12A) in any one of the first to fourth aspects. The third circuit element (E3) is the reception filter (22B).

In the radio frequency module (1e) according to the eighth aspect, in a case in which the substrate of each of the transmission filter (12A) and the reception filter (22B) is a silicon substrate, for example, each substrate of the transmission filter (12A) and the reception filter (22B), which are flip-chip mounted on the second main surface (92) of the mounting substrate (9), may easily be ground from the side of the second main surface that is opposite to the first main surface facing the mounting substrate (9), at the time of manufacturing. This makes it possible to reduce the height of the radio frequency module (1e).

In a radio frequency module (1f; 1h) according to a ninth aspect, the plurality of external connection terminals (80) includes the antenna terminal (81; 81A) in any one of the first to fourth aspects. The second circuit element (E2) is the power amplifier (11). The third circuit element (E3) is an antenna switch (first switch 4; 4h). The antenna switch (first switch 4; 4h) has a common terminal (40; 40A) that is electrically connected to the antenna terminal (81; 81A) and through which a transmission signal and a reception signal pass.

In the radio frequency module (1g; 1h) according to a tenth aspect, the second circuit element (E2) is the power amplifier (11) in any one of the first to fourth aspects. The third circuit element (E3) is the low-noise amplifier (21).

The communication device (300; 300h) according to an eleventh aspect includes the radio frequency module (1; 1a; 1b; 1c; 1d; 1e; 1f; 1g; 1h) according to any one of the first to tenth aspects, and the signal processing circuit (301). The signal processing circuit (301) processes a transmission signal and a reception signal.

In the communication device (300; 300h) according to the eleventh aspect, it is possible to improve the isolation between the second circuit element (E2) and the third circuit element (E3), in a case in which the second circuit element (E2) provided in the signal path for a transmission signal and the third circuit element (E3) provided in the signal path for a reception signal are mounted on the second main surface (92) of the mounting substrate (9).

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio frequency module including
a mounting substrate having a first main surface and a second main surface on opposite sides of the mounting substrate;
a power amplifier mounted on the first main surface of the mounting substrate;
a switch mounted on the second main surface of the mounting substrate and provided in a signal path for a transmission signal;
a low noise amplifier mounted on the second main surface of the mounting substrate and provided in a signal path for a reception signal; and
a ground terminal positioned between the switch and the low noise amplifier as viewed in a plan view from a thickness direction of the mounting substrate.

2. The radio frequency module of claim 1, wherein the ground terminal is a bump.

3. The radio frequency module of claim 1, wherein the ground terminal is a columnar electrode.

4. The radio frequency module of claim 1, wherein the power amplifier passes a radio frequency signal in a first frequency band of a first communication standard.

5. The radio frequency module of claim 4, wherein the transmission signal is a radio frequency signal in a second frequency band of a second communication standard different from the first communication standard.

6. The radio frequency module of claim 5, wherein the reception signal is a radio frequency signal in the second frequency band of the second communication standard.

7. The radio frequency module of claim 6, further comprising:
a plurality of external connection terminals arranged on the second main surface of the mounting substrate, the plurality of external connection terminals including the ground terminal positioned between the switch and the low noise amplifier as viewed in a plan view from a thickness direction of the mounting substrate, wherein the plurality of external connection terminals includes a signal terminal electrically connected to the power amplifier.

8. The radio frequency module of claim 7, wherein the signal terminal is positioned between the switch and the low noise amplifier as viewed in the plan view from the thickness direction of the mounting substrate.

9. The radio frequency module of claim 1, further comprising:
a plurality of external connection terminals arranged on the second main surface of the mounting substrate, the plurality of external connection terminals including the ground terminal positioned between the switch and the low noise amplifier as viewed in a plan view from a thickness direction of the mounting substrate, wherein the plurality of external connection terminals includes an antenna terminal.

10. The radio frequency module of claim 1, wherein the switch is an antenna switch including a common terminal that is electrically connected to an antenna terminal and through which the transmission signal and the reception signal pass.

11. The radio frequency module of claim 1, wherein the switch is a band select switch having a function of switching signal paths for a plurality of transmission signals in mutually different communication bands and a function of switching signal paths for a plurality of reception signals in mutually different communication bands.

12. The radio frequency module of claim 1, further comprising:
an output matching circuit electrically connected to an output terminal of the power amplifier and including an inductor.

13. The radio frequency module of claim 12, further comprising:
an input matching circuit electrically connected to an input terminal of the low-noise amplifier and including an inductor.

14. The radio frequency module of claim 13, wherein the inductor of the output matching circuit is mounted on the second main surface of the mounting substrate and provided in the signal path for the transmission signal, and
the inductor of the input matching circuit is mounted on the second main surface of the mounting substrate and provided in the signal path for the reception signal.

15. The radio frequency module of claim 1, further comprising:
a transmission filter mounted on the second main surface of the mounting substrate and provided in the signal path for the transmission signal; and
a reception filter mounted on the second main surface of the mounting substrate and provided in the signal path for the reception signal.

16. A communication device comprising:
a radio frequency module including
a mounting substrate having a first main surface and a second main surface on opposite sides of the mounting substrate;
a power amplifier mounted on the first main surface of the mounting substrate;
a switch mounted on the second main surface of the mounting substrate and provided in a signal path for a transmission signal;
a low noise amplifier mounted on the second main surface of the mounting substrate and provided in a signal path for a reception signal; and
a ground terminal positioned between the switch and the low noise amplifier as viewed in a plan view from a thickness direction of the mounting substrate; and
a signal processing circuit configured to process the transmission signal and the reception signal.

17. The communication device of claim 16, wherein the ground terminal is a bump.

18. The communication device of claim 16, wherein the ground terminal is a columnar electrode.

19. The communication device of claim 16, wherein the power amplifier passes a radio frequency signal in a first frequency band of a first communication standard.

20. The communication device of claim 19, wherein the transmission signal is a radio frequency signal in a second frequency band of a second communication standard different from the first communication standard.

* * * * *